US011026434B2

(12) United States Patent
Sukey

(10) Patent No.: US 11,026,434 B2
(45) Date of Patent: Jun. 8, 2021

(54) POWER OPERATED TRIMMING TOOL

(71) Applicant: Bettcher Industries, Inc., Birmingham, OH (US)

(72) Inventor: Jason A. Sukey, Elyria, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 676 days.

(21) Appl. No.: 15/696,866

(22) Filed: Sep. 6, 2017

(65) Prior Publication Data

US 2019/0069564 A1    Mar. 7, 2019

(51) Int. Cl.
*A22B 5/16* (2006.01)
*B25G 1/04* (2006.01)
*A22C 17/12* (2006.01)

(52) U.S. Cl.
CPC .............. *A22B 5/166* (2013.01); *A22C 17/12* (2013.01); *B25G 1/04* (2013.01)

(58) Field of Classification Search
CPC ............ A22B 5/166; A22C 17/12; B25G 1/04
USPC ......................................................... 99/567
See application file for complete search history.

(56) References Cited

U.S. PATENT DOCUMENTS

| | | |
|---|---|---|
| 1,379,153 A | 5/1921 | Young |
| 2,540,462 A | 2/1951 | Smith |
| 2,730,100 A | 6/1956 | Hood |
| 3,174,599 A | 3/1965 | Spyridakis et al. |
| 3,197,808 A | 8/1965 | Mears |
| 3,670,734 A | 6/1972 | Hardy, Jr. |
| 4,071,923 A | 2/1978 | Smith |
| 4,186,461 A | 2/1980 | Leining |
| 4,451,953 A | 6/1984 | Leining |
| 4,794,273 A | 12/1988 | McCullough et al. |
| 4,894,915 A | 1/1990 | Decker et al. |

(Continued)

FOREIGN PATENT DOCUMENTS

| | | |
|---|---|---|
| CA | 1242854 | 10/1988 |
| GB | 1515047 | 6/1978 |

OTHER PUBLICATIONS

Operators Manual for Integra Model C Air Dermatome Manufactured by Integra LifeSciences Corporation, Copyright 2009, Cincinnati, OH (82 pages) (Exhibit A).

(Continued)

*Primary Examiner* — Dana Ross
*Assistant Examiner* — Joseph W Iskra
(74) *Attorney, Agent, or Firm* — Tarolli, Sundheim, Covell & Tummino LLP

(57) ABSTRACT

A power operated trimming tool including a head assembly affixed to a handle assembly. The head assembly includes a frame body supporting a feed roll, a blade, a blade support and a blade retainer plate. The frame body includes an interface portion affixed to the handle assembly and a support portion extending from the interface portion. The blade support includes a cross member of the frame body and defines a blade support slot and a blade receiving opening at a rearward end of the slot. The blade retainer plate is pivotally coupled to the frame body and pivots between first and second positions, in the first position, the blade retainer plate positioned in proximity to the blade receiving opening of the blade support and, in the second position, the blade retainer plate being spaced from the blade receiving opening allowing access to a back side of the blade.

26 Claims, 18 Drawing Sheets

(56) References Cited

U.S. PATENT DOCUMENTS

| | | |
|---|---|---|
| 8,002,779 B2 | 8/2011 | Barker et al. |
| 8,608,755 B2 | 12/2013 | Mahaffey et al. |
| 8,814,881 B2 | 8/2014 | Boles |
| 8,926,632 B2 | 1/2015 | Mahaffey et al. |
| 9,121,438 B2 | 9/2015 | Mascari |
| 9,480,263 B2 | 11/2016 | Van Der Leest et al. |
| 9,516,887 B1 * | 12/2016 | Ewers .................... A22B 5/166 |
| 9,913,482 B2 | 3/2018 | Karubian |
| 2004/0187316 A1 | 9/2004 | Whited et al. |
| 2004/0216976 A1 * | 11/2004 | Droste ................ B25D 16/003 |
| | | 192/55.1 |
| 2009/0138027 A1 | 5/2009 | Lucas et al. |
| 2009/0157095 A1 | 6/2009 | Barker et al. |
| 2014/0236180 A1 | 8/2014 | Shafirstein et al. |
| 2016/0031103 A1 * | 2/2016 | Mascari ............... B26B 25/002 |
| | | 30/124 |
| 2016/0174581 A1 | 6/2016 | Van Der Leest et al. |
| 2017/0142985 A1 | 5/2017 | Chappell, Jr. |

OTHER PUBLICATIONS

Instruction Manual for Zimmer TM Air Dermatome, Manufactured by Zimmer Surgical, Inc., Dover, OH, Copyright 1992 (127 pages) (Exhibit B).

Operators Manual, Integra TM, Model SB Dermatome, Manufactured by Integra LifeSciences Corporation, Plainsboro, New Jersey, Copyright 2005 (6 pages) (Exhibit C).

Informational Brochure for Humeca Dermatome Blades, Manufactured by Humeca BV, Enschede, The Netherlands, publication date Oct. 2008 (1 page) (Exhibit D).

* cited by examiner

POWER OPERATED TRIMMING TOOL

TECHNICAL FIELD

The present disclosure relates to a power operated tool used for effectively trimming outer layers of tissue or skin from a meat product, for example, trimming or removing an outer layer of fat from a hog carcass or a pork loin product, the tool including a stationary or fixed blade and a power-driven rotating feed roll for engaging and advancing a layer of tissue toward the fixed blade for cutting the layer of tissue from the remaining product.

BACKGROUND

Power operated skinning devices are used to remove skin from animal carcasses. Such devices are disclosed, for example, in U.S. Pat. No. 4,186,461 to Leining, U.S. Pub. No. US 2016/0174581 A1 to Van Der Leest et al., and U.S. Pat. No. 9,516,887 to Ewers. Such devices typically include a driven tooth roll or feed roll which engages and advances an outer layer of tissue or skin of the animal carcass toward a fixed or stationary cutting blade which severs the outer layer of tissue from the remaining tissue of the animal carcass. The feed roll may be driven by a motor, such as a pneumatic or electric motor, disposed in a handle of the device.

SUMMARY

In one aspect, the present disclosure relates to a power operated trimming tool comprising: an elongated handle assembly including a throughbore extending along a longitudinal axis of the handle assembly; a drive gear including a worm gear driver, the drive gear supported for rotation about a drive gear axis of rotation; a head assembly affixed to the handle extension of the handle assembly, the head assembly including a frame body supporting a feed roll, a blade and a blade retainer assembly; the feed roll supported for rotation about a feed roll axis of rotation and including an outer surface including a worm gear driven by the drive gear; the blade including a forward side, a back side and first and second lateral sides extending between the forward and back sides, a cutting edge of the blade extending along the forward side, the cutting edge being in proximity to the outer surface of the feed roll; the frame body including an interface portion and a support portion extending from the interface portion, the interface portion coupled to a distal end portion of the handle assembly to couple the head assembly to the handle assembly, the support portion defining an interior region and including an upper wall and first and second side walls extending from opposite ends of the upper wall, a rear wall extending from the upper wall and extending between the first and second side walls and a cross member extending between the first and second side walls, the cross member being part of a blade support assembly for fixedly supporting the blade with respect to the frame body, a forward portion of the blade support assembly being closer to the outer surface of the feed roll and a rearward portion defining a blade receiving opening of the blade support assembly to receive the blade; and the blade retainer assembly comprising a blade retainer plate including a first, inner wall and a second, outer wall, the blade retainer plate pivotally coupled to the frame body to pivot about a pivot axis between a first, blade retaining position and a second, blade changing position, in the first, blade retaining position, the blade retainer plate positioned in proximity to the rearward portion of the blade support assembly and, in the second, blade changing position, the blade retainer plate being spaced from the rearward portion of the blade support assembly allowing access to the back side of the blade.

In another aspect, the present disclosure relates to a power operated trimming tool comprising: an elongated handle assembly including a throughbore extending along a longitudinal axis of the handle assembly, the handle assembly including handle including a handle body and a handle extension extending distally from the handle body, the handle extension including a bearing seating region; a shaft support assembly including first and second bearing support assemblies disposed in the bearing seating region of the handle extension; a drive gear supported for rotation about a drive gear axis of rotation by the shaft support assembly; a head assembly affixed to the handle extension of the handle assembly, the head assembly including a frame body, a feed roll, a blade and a blade retainer assembly; the feed roll supported for rotation about a feed roll axis of rotation and including an outer surface; the blade including a forward side, a back side and first and second lateral sides extending between the forward and back sides, a cutting edge of the blade extending along the forward side; the frame body including an interface portion and a support portion extending from the interface portion, the interface portion coupled to a distal end portion of the handle extension to couple the head assembly to the handle assembly, the support portion defining an interior region and including an upper wall and first and second side walls extending from opposite ends of the upper wall, a rear wall extending from the upper wall and extending between the first and second side walls, and a cross member extending between the first and second side walls, the cross member being part of a blade support for fixedly supporting the blade with respect to the frame body, the blade support including a blade receiving opening to receive the blade; and the blade retainer assembly comprising a blade retainer plate including a first, inner wall and a second, outer wall, the blade retainer plate located between the first and second side walls of the frame body and pivotally coupled to the frame body to pivot about a pivot axis between a first, blade retaining position and a second, blade changing position, in the first, blade retaining position, the blade retainer plate positioned in proximity to the blade receiving opening of the blade support and, in the second, blade changing position, the blade retainer plate being spaced from the blade retraining opening of the blade support allowing access to the back side of the blade.

In another aspect, the present disclosure relates to a head assembly for a power operated trimming tool, the head assembly comprising: a frame body supporting a feed roll, a blade and a blade retainer assembly; the feed roll coupled to the frame body and supported for rotation about a feed roll axis of rotation; the blade including a forward side, a back side and first and second lateral sides extending between the forward and back sides, a cutting edge of the blade extending along the forward side; the frame body including a support portion defining an interior region and including an upper wall and first and second side walls extending from opposite ends of the upper wall, a rear wall extending from the upper wall and extending between the first and second side walls and a cross member extending between the first and second side walls, the cross member being part of a blade support assembly for fixedly supporting the blade with respect to the frame body, the blade support assembly including a forward portion being closer to the feed roll and a rearward portion defining a blade receiving opening of the blade support to receive the blade; and the blade retainer assembly comprising a blade retainer plate including a first, inner wall and a second, outer wall, the blade retainer plate located between the first and second side walls of the frame body and pivotally coupled to the frame body to pivot about a pivot axis between a first, blade retaining position and a second, blade changing position, in the first, blade retaining position, the blade retainer plate positioned in proximity to the rearward portion of the blade support assembly and, in the second, blade changing position, the blade retainer plate being spaced from the rearward portion of the blade support assembly allowing access to the back side of the blade.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which.

DETAILED DESCRIPTION

Figure 1:
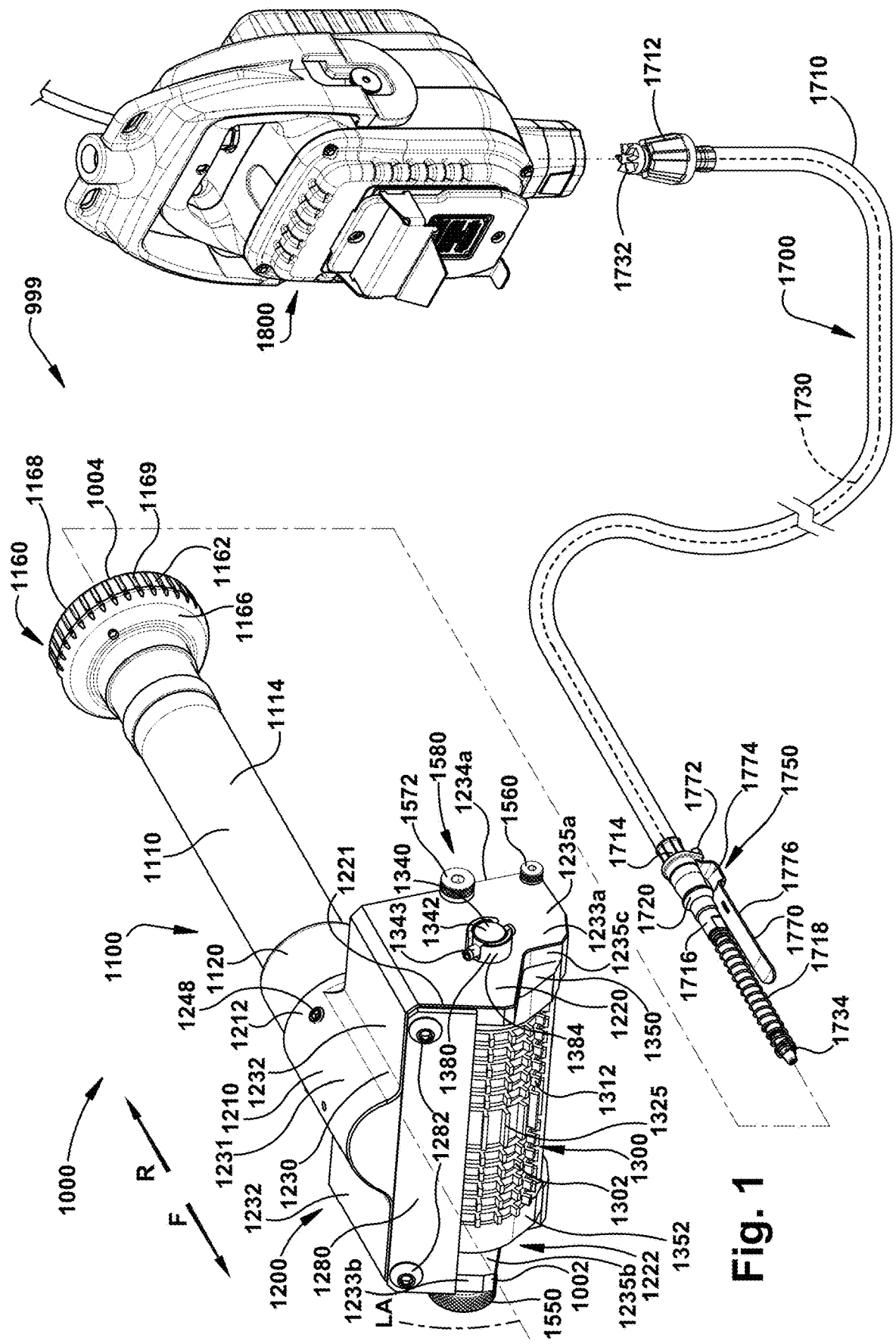
FIG. 1 is a schematic exploded, top, front perspective view of a first exemplary embodiment of a power operated trimming tool assembly of the present disclosure including a power operated trimming tool, a flexible shaft drive transmission and an external motor, the power operated trimming tool including a handle assembly, a head assembly, including a frame body, a feed roll assembly having a feed roll, a drive mechanism to rotate the feed roll about a feed roll axis of rotation, a fixed blade having a cutting edge, a blade support assembly for supporting the blade in a fixed position with respect to the rotating feed roll, and a blade retainer assembly.

The present disclosure relates to a power operated trimming tool assembly shown generally at 999 in FIG. 1. In one exemplary embodiment, the power operated trimming tool assembly 999 includes a power operated trimming tool, shown generally at 1000, in FIGS. 1-10, an external motor 1800 which provides motive power to rotatably drive a feed roll 1302 of a feed roll assembly 1300 of the power operated trimming tool 1000 about a feed roll axis of rotation FRA, and a flexible shaft drive transmission 1700 that mechanically couples a rotating output drive shaft (not shown) of the motor 1800 to rotate a drive mechanism 1600 of the power operated trimming tool 1000 to thereby rotate the feed roll 1302 about its axis of rotation FRA. The external motor 1800 is remote from the power operated trimming tool 1000 thereby advantageously providing for a lighter weight for the power operated trimming tool compared to, for example, a power operated trimming tool wherein a pneumatic or electric motor is mounted in a handle assembly of the trimming tool. As an operator must manipulate the trimming tool to properly orient and move the tool when cutting a layer of tissue from a workpiece, a reduction in weight of the tool reduces operator fatigue and provides for increased operator productivity over a work shift. Additionally, and advantageously, the drive mechanism 1600 of the power operated trimming tool 1000 may be configured to provide an optimal rotational speed for the feed roll 1302 such a desired linear feed rate, as measured at an outer surface 1312 of the feed roll 1302 may be achieved given the characteristics of the workpiece to be cut or trimmed, i.e., removing or trimming an outer layer of fat tissue from a hog carcass or a pork loin product.

Overview

The power operated trimming tool 1000 extends between a forward or distal end 1002 and a rearward or proximal end 1004. The power operated trimming tool 1000 includes an elongated handle assembly 1100 extending along a longitudinal axis LA and a head assembly 1200 coupled to a distal end portion 1106 of the handle assembly 1100. The handle assembly 1100 defines a generally cylindrical throughbore 1102 that is centered about the handle assembly longitudinal axis and includes a handle body 1110, a handle extension 1120 extending distally from the handle body 1110 and a driver retainer assembly 1160 extending proximally from the handle body 1110. A central portion 1114 of the handle body 1110 is generally cylindrical and receives an overlying contoured hand piece (not shown) that is gripped by the operator to manipulate the power operated trimming tool 1000.

Figure 8:
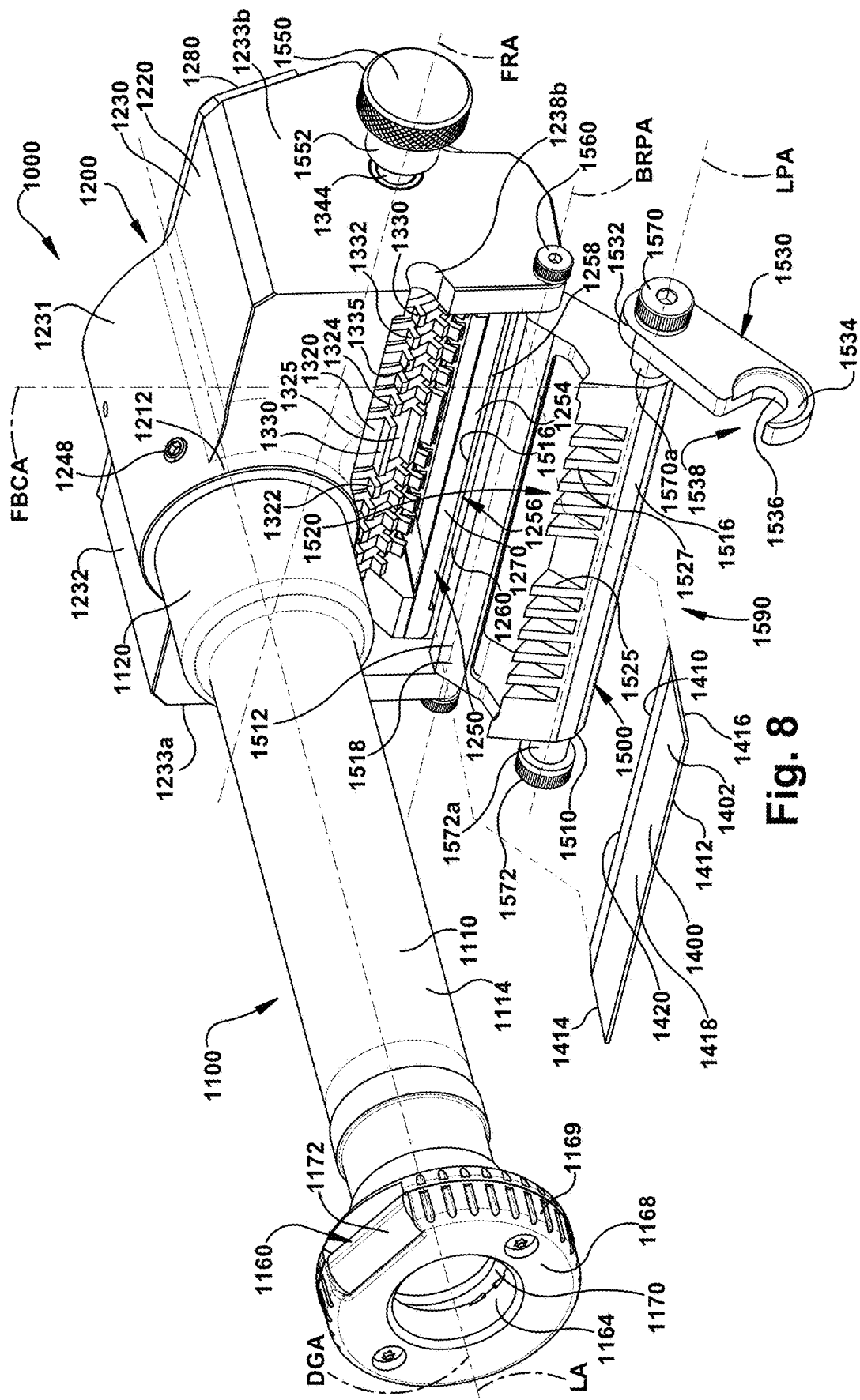
FIG. 8 is a schematic top, rear perspective view of the power operated trimming tool of FIG. 1, with the blade retainer assembly in a second blade changing position and with the blade removed from the blade support.

The head assembly 1200 of the power operated trimming tool 1000 extends from the distal end portion 1106 of the handle assembly 1100 and includes a generally box-like frame body 1210 including an interface portion 1212, that is coupled to the handle extension 1120 of the handle assembly 1100 to secure the head assembly 1200 to the handle assembly 1100, and a support portion 1220, that supports the feed roll assembly 1300 within art interior region 1222 of the support portion 1220. The support portion 1220 also supports a fixed or stationary blade 1400 and a blade retainer assembly 1500, which are also part of the head assembly 1200. The support portion 1220 of the frame body 1210 includes an upper wall 1230 bridging spaced apart first and second side walls 1233a, 1233b and a rear wall 1245 extending from the upper wall 1230 and extending a portion of the way down the first and second side walls 1233a, 1233b. The frame body 1210 further includes a cross member 1240 that extends between respective lower portions 1235a, 1235b of the first and second side walls 1233a, 1233b. The cross member 1240 defines a lower blade support ledge 1260 which forms a portion of a blade support assembly 1250, which is also part of the head assembly 1200. Thus, the lower blade support ledge 1260 of the blade support assembly 1250 is a rigid part of the frame body 1210. As best seen in FIG. 8, the blade 1400 includes a generally rectangular, planar body 1402 including a forward region or side 1410 and a back side 1410 separated by first and second lateral sides 1414, 1416. The blade 1400 includes a cutting edge along a peripheral edge of the forward side 1410. The blade support assembly 1250 fixes a position of the forward cutting edge 1420 of the fixed blade 1400 with respect to the rotating feed roll 1302, thereby determining a cutting depth of the power operated trimming tool 1000. The cutting edge 1420 of the blade 1400 is in proximity to the outer surface 1312 of the feed roll 1302. The cutting depth of the trimming tool 1000 being determined by a radial distance between the outer surface 1312 and the cutting edge 1420 of the blade 1400.

Figure 3:
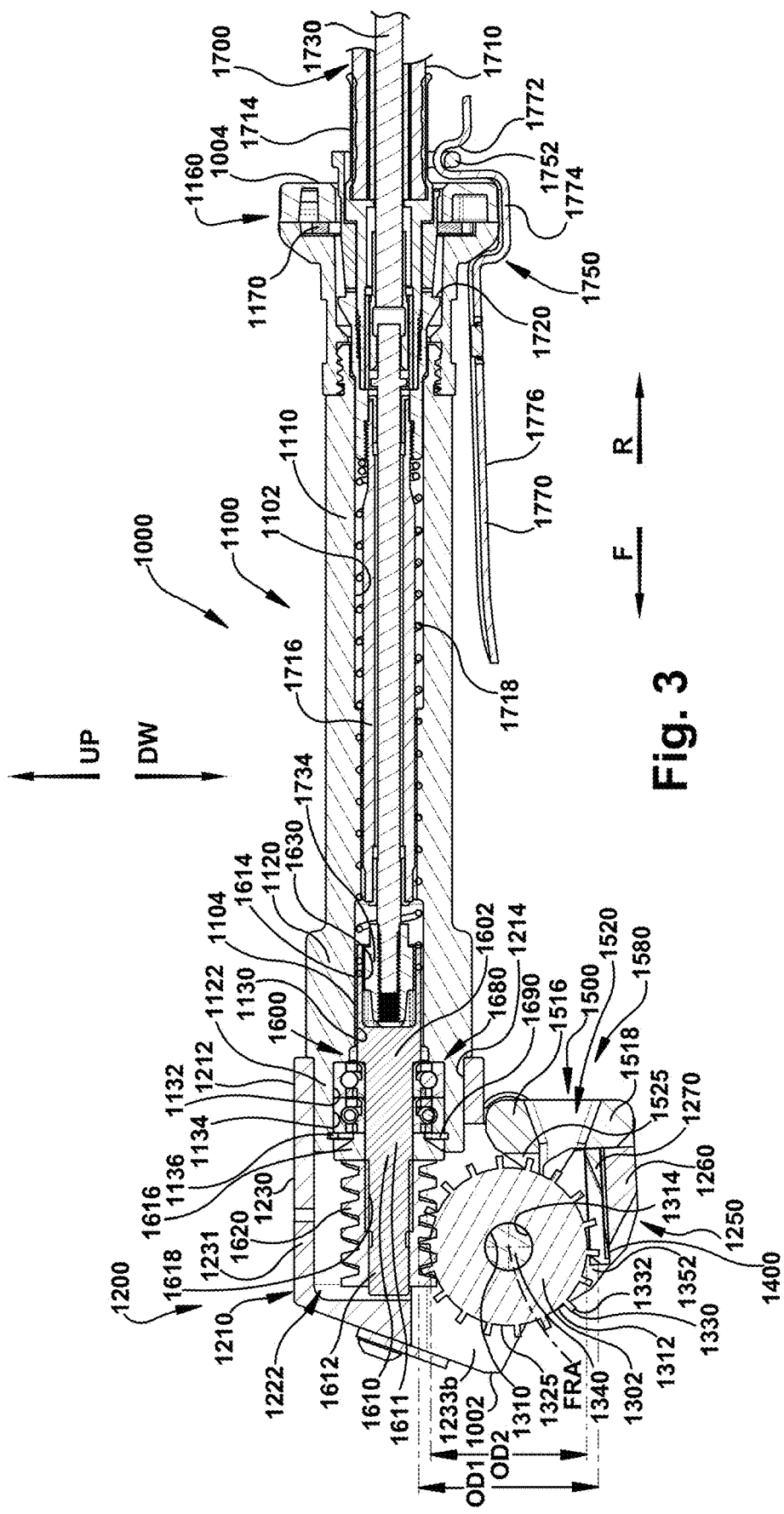
FIG. 3 is a schematic longitudinal sectional view of the power operated trimming tool assembly of FIG. 2.
Figure 4:
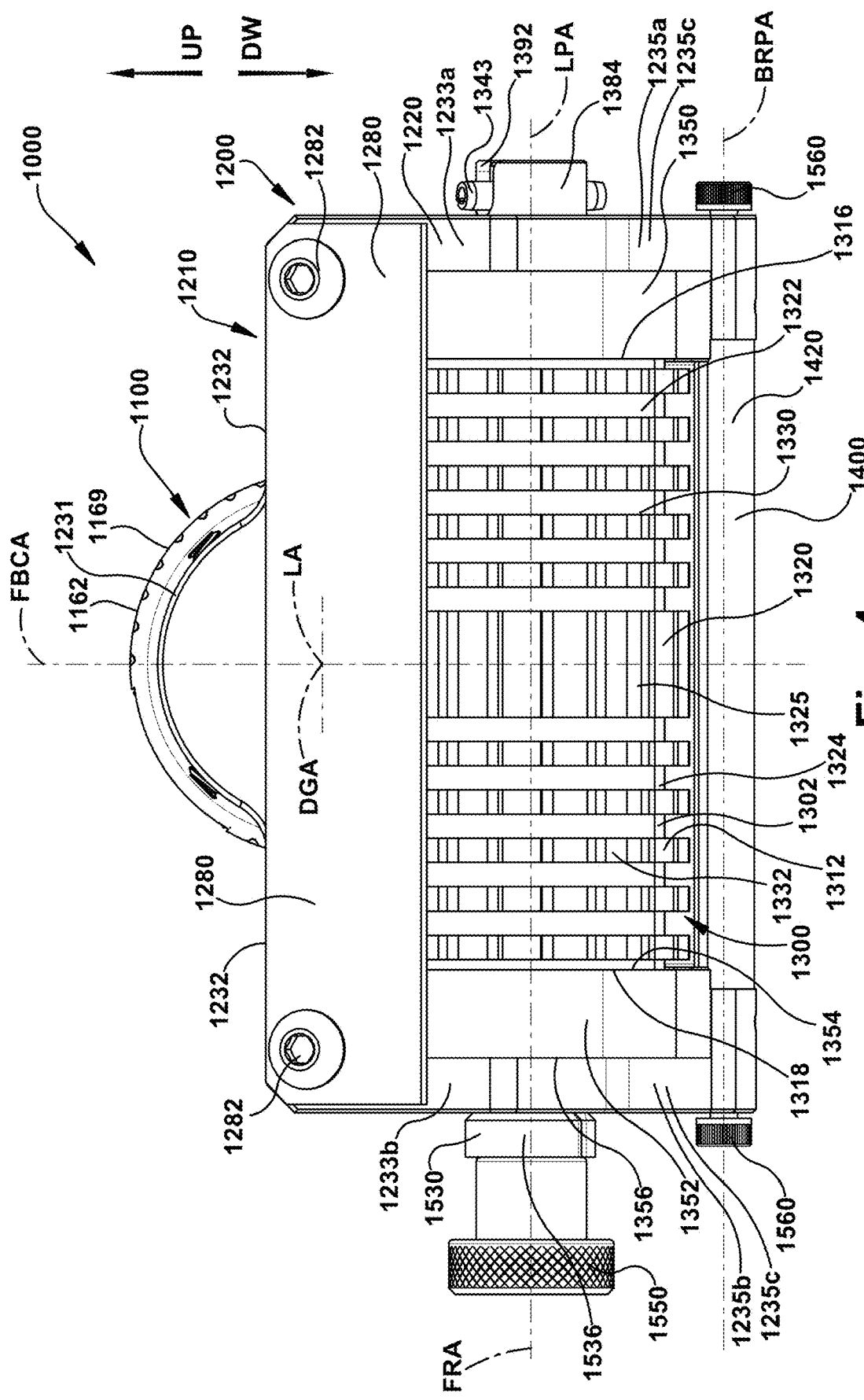
FIG. 4 is a schematic front elevation view of the power operated trimming tool of FIG. 1, with the blade retainer assembly in a first blade retaining position.
Figure 5:
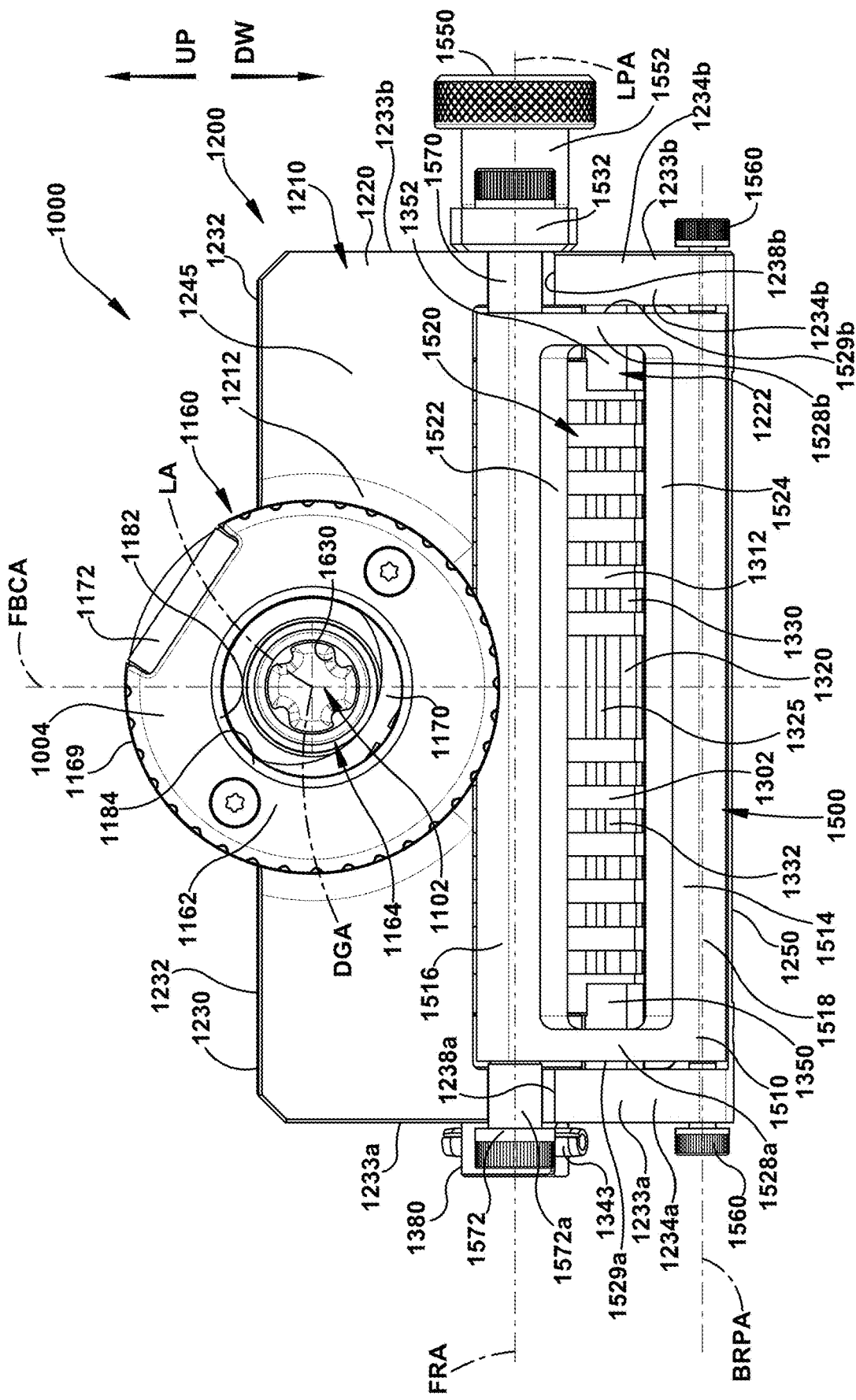
FIG. 5 is a schematic rear elevation view of the power operated trimming tool of FIG. 1, with the blade retainer assembly in the first blade retaining position.
Figure 6:
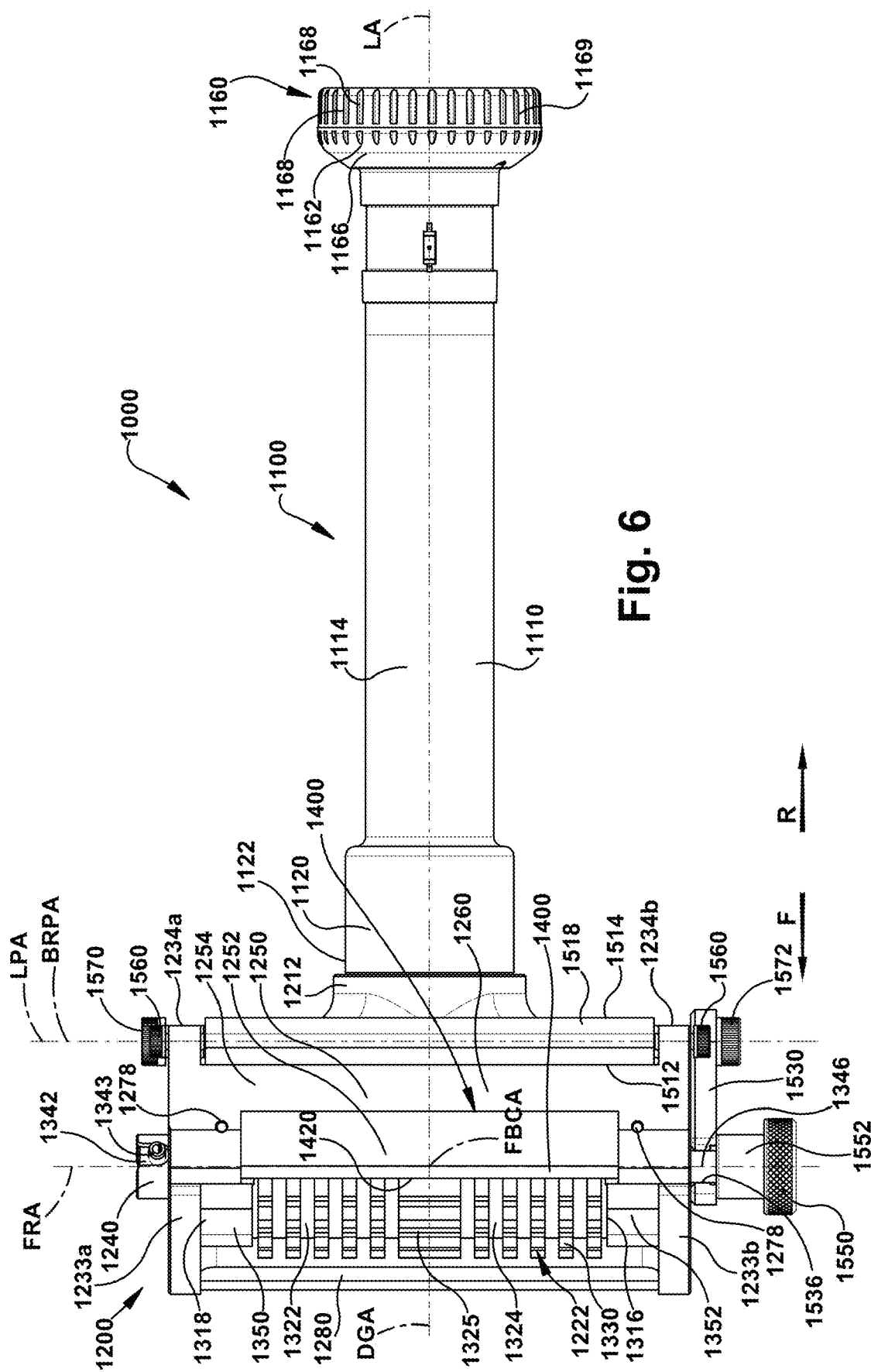
FIG. 6 is a schematic bottom plan view of the power operated trimming tool of FIG. 1, with the blade retainer assembly in the first blade retaining position.
Figure 10:
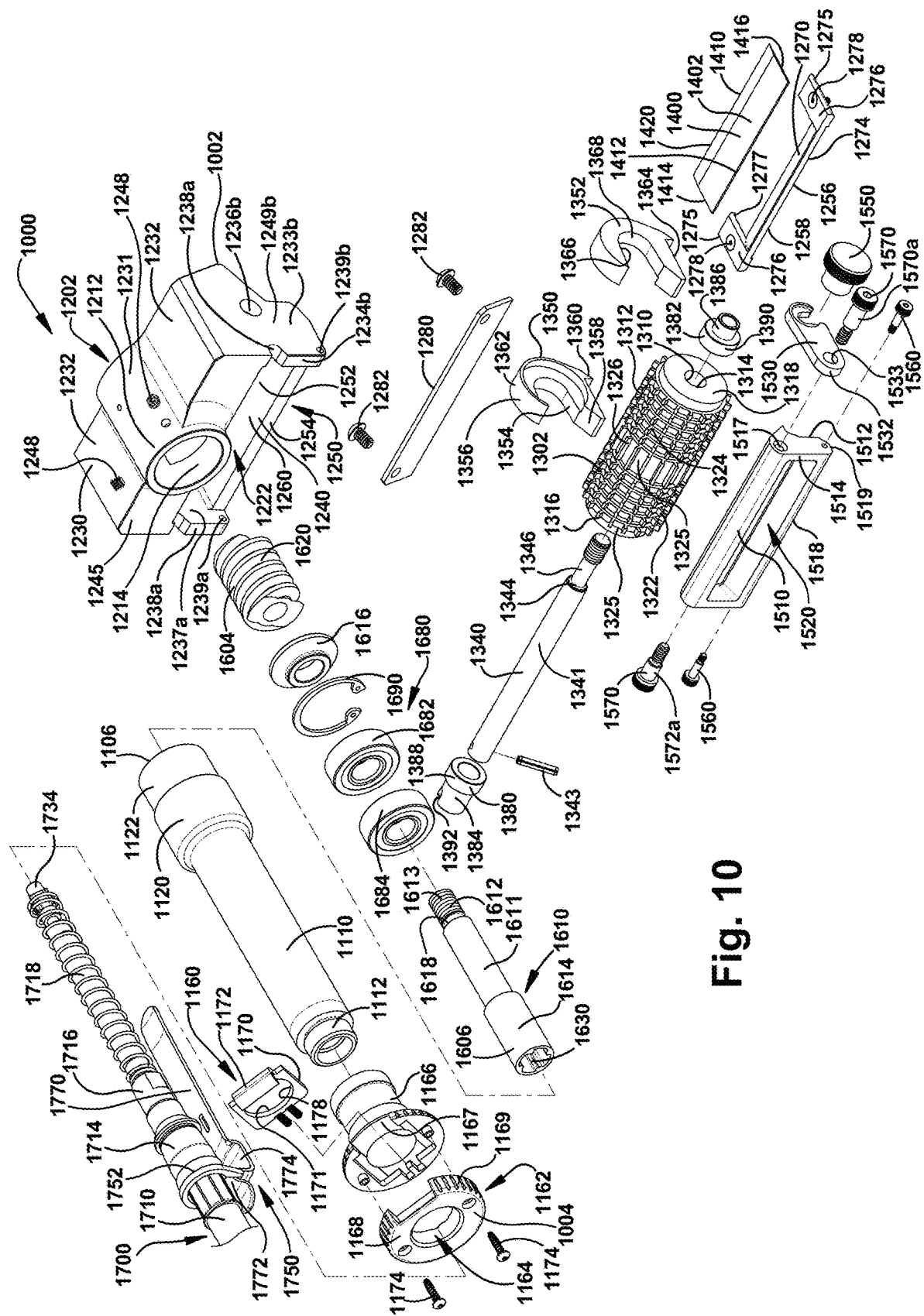
FIG. 10 is a schematic exploded, top, rear perspective view of the power operated trimming tool assembly of FIG. 1 including the power operated trimming tool and a portion of the flexible shaft drive transmission including the drive disengagement assembly at the distal end portion of the flexible shaft drive transmission.
Figure 13:
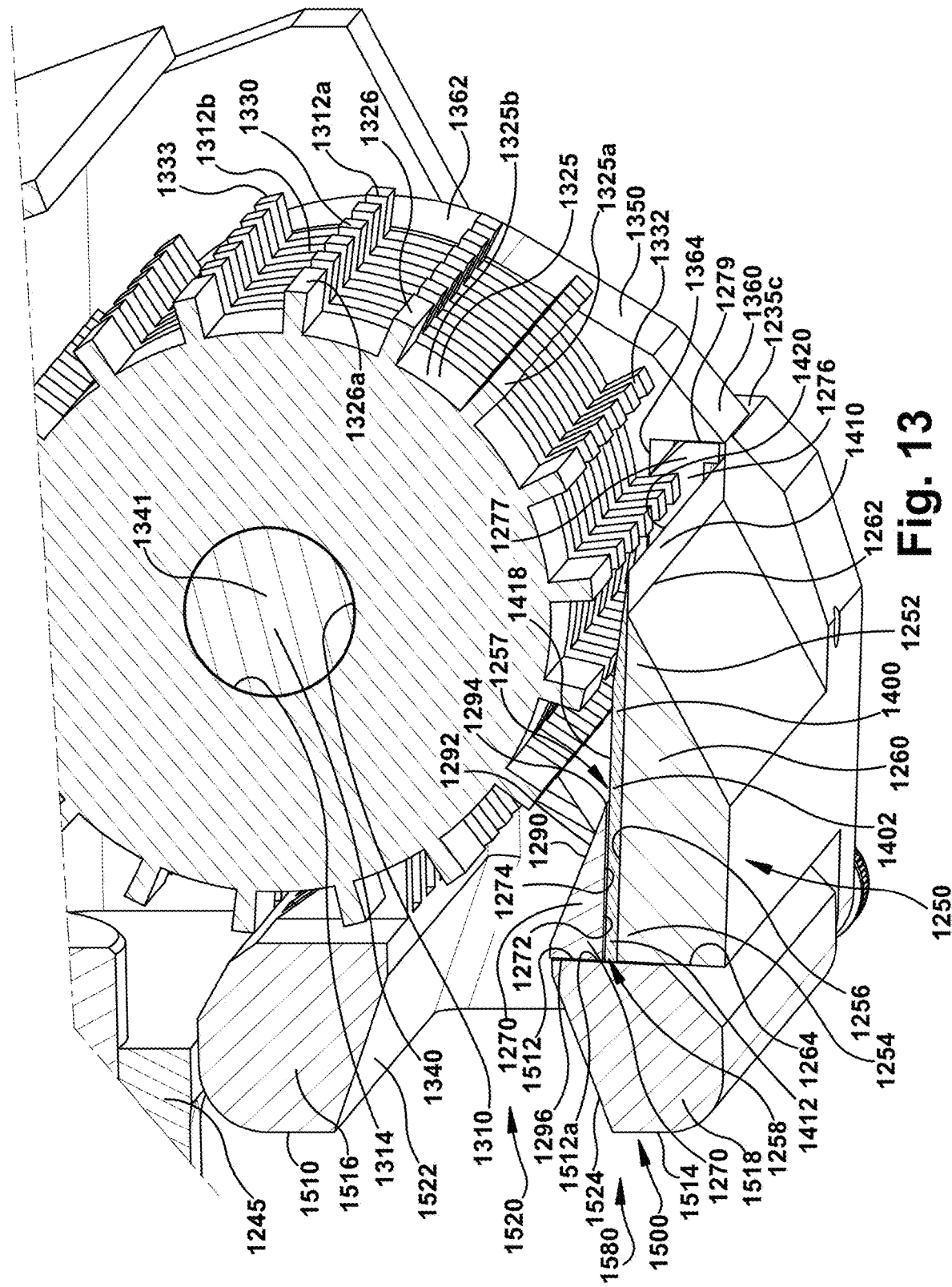
FIG. 13 is a schematic bottom, front, perspective longitudinal section view of a front portion of the power operated trimming tool of FIG. 1 including portions of the frame body, the feed roll assembly, the blade, the blade support, and the blade retainer assembly.

In one exemplary embodiment, as best seen in FIGS. 3, 10 and 13, an outer surface 1312 of the feed roll 1302 includes a central portion 1320 and first and second flanking portions 1322, 1324 of the outer surface 1312 which are on opposite sides of the central portion 1320. The first and second flanking portions 1322, 1324 include a plurality of radially outwardly extending teeth or projections 1335 which extend from a base surface 1337. Thus, with respect to the flanking portions 1322, 1324, the outer surface 1312 comprises two surfaces or two levels, an extending outer surface 1312a, which defines a maximum outer diameter OD1 of the feed roll 1302 and is defined by the respective outer or distal surfaces 1333 of the plurality of projections 1335, and a base outer surface 1312b, which defines a second, smaller outer diameter OD2 of the feed roll 1302.

The central portion 1320 of the outer surface 1312 defines a worm gear or worm wheel 1325. The worm gear 1324 is engaged and rotated by a worm or worm screw or worm gear driver 1620 which is part of a drive gear 1602 of a drive mechanism 1600. Rotation of the drive gear 1602 about a drive gear axis of rotation DGA causes the feed roll 1302 to rotate about a feed roll axis of rotation FRA. The drive gear axis of rotation DGA is substantially aligned with and coincident with the handle assembly longitudinal axis LA. The feed roll axis of rotation FRA offset from and substantially orthogonal to the drive gear axis of rotation DGA. The flanking portions 1322, 1324 of the outer surface 1312 of the feed roll 1302 include a plurality of radially extending projections or teeth 1330 that engage the workpiece and, as the feed roll 1302 rotates about its axis of rotation FRA and the operator moves the power operated trimming tool along an outer surface of the workpiece, urges the workpiece into contact with the cutting edge 1420 of the blade 1400 such that a desired outer layer of the workpiece is trimmed or severed from the workpiece, at the desired cutting depth. In one exemplary embodiment, the plurality of projections 1335 comprise a plurality of circumferential teeth sets 1330. Each set of the plurality of circumferential teeth sets 1330 includes a plurality of circumferentially spaced apart, radially outwardly extending teeth 1332. The each of the plurality of teeth 1332 have a generally spiked rectangular shape to facilitate engaging and penetrating the outer surface of the workpiece such that, as the feed roll 1302 rotates, the workpiece is firmly urged or pushed against the cutting edge 1420 of the blade 1400.

Centered between and extending generally vertically and parallel to the first and second side walls 1233a, 1233b is a frame body central axis FBCA (FIGS. 2 and 4-7). The frame body central axis FBCA is generally orthogonal to and intersects the feed roll axis of rotation FRA and is generally orthogonal to and intersects the handle assembly longitudinal axis LA. The feed roll 1302 includes a central opening or central through bore or central throughbore 1314 defined by an inner surface 1310 of the feed roll 1302. The central throughbore 1314 of the feed roll 1302 receives a feed roll shaft 1340 that extends beyond first end second ends 1316, 1318 of the feed rod 1302 and defines the feed roll axis of rotation FRA. The feed roll shaft 1340 does not rotate, rather the feed roll 1302 rotates on the feed roll shaft 1340. The feed roll shaft 1340 is supported, in turn, by the first and second side walls 1233a, 1233b of the frame body. A pair of stationary, generally c-shaped spacers 1350, 1352 are interposed between respective inwardly facing surfaces 1237a, 1237b of the first and second side walls 1233a, 1233b and the respective opposite first and second ends 1316, 1318 of the feed roll 1302. The spacers 1350, 1352 advantageously maintain the feed roll 1302 in a centered position between the side walls 1233*a*, 1233*b* and act as blocking members to prevent the build-up of debris (pieces fat, gristle, bone, etc. resulting from the cutting/trimming process at the blade cutting edge 1420 or by the penetration of the plurality of projections 1335 into the outer surface of the workpiece), in the interior region 1222 of the support portion 1220 of the frame body 1210 between the inwardly facing surfaces 1237*a*, 1237*b* of the first and second side walls 1233*a*, 1233*b* and the first and second ends 1316, 1318 of the feed roll 1302. The build-up of debris in the interior region 1222 of the support portion 1220 of the frame body 1210 is undesirable as such a build-up would typically result in the generation of heat, the "cooking" of debris resulting from the generated heat creating a gummy, sticky mixture of melted or partially melted debris in the region of the feed roll 1302, and greater stress being placed on components of the drive mechanism 1600, the shaft support assembly 1680, the flexible shaft drive transmission 1700 and the motor 1800 in rotating feed roll 1302 about its axis of rotation FRA.

As seen in FIG. 1, the external motor 1800 is operatively coupled to the drive mechanism 1600 via the flexible shaft drive transmission 1700. In one exemplary embodiment, the shaft drive transmission includes an outer casing 1710 and a flexible drive shaft or flex shaft 1730 which is rotatably supported within the outer casing 1710. The flex shaft 1730 defines a central longitudinal axis LCA (shown schematically in FIG. 1) of the shaft drive transmission 1700 and the flex shaft 1730 rotates about a flex shaft axis of rotation FSA which is aligned with and coincident with the central longitudinal axis LCA of the flexible transmission 1700. The outer casing 1710 of the shaft drive transmission 1700 includes a motor end coupling 1712 at a proximal end of the casing 1710 and a tool end coupling 1714 at a distal end of the easing 1710. The tool end coupling 1714 includes a driver assembly 1716 which extends into the throughbore 1102 of the handle assembly 1100 and is releasably coupled to the handle assembly 1100 by the driver retainer assembly 1160. The flex shaft 1730 includes a driven fitting 1732 at a proximal end of the flex shaft 1730 and a drive fitting 1734 at a distal end of the flex shaft 1730. When the motor end coupling 1712 is releasably coupled to a motor coupling 1802 of the motor 1800, the driven fitting 1732 of the flex shaft 1730 engages and is rotated by mating motor fitting (not shown) affixed to the output drive shaft of the motor 1800.

Figure 2:
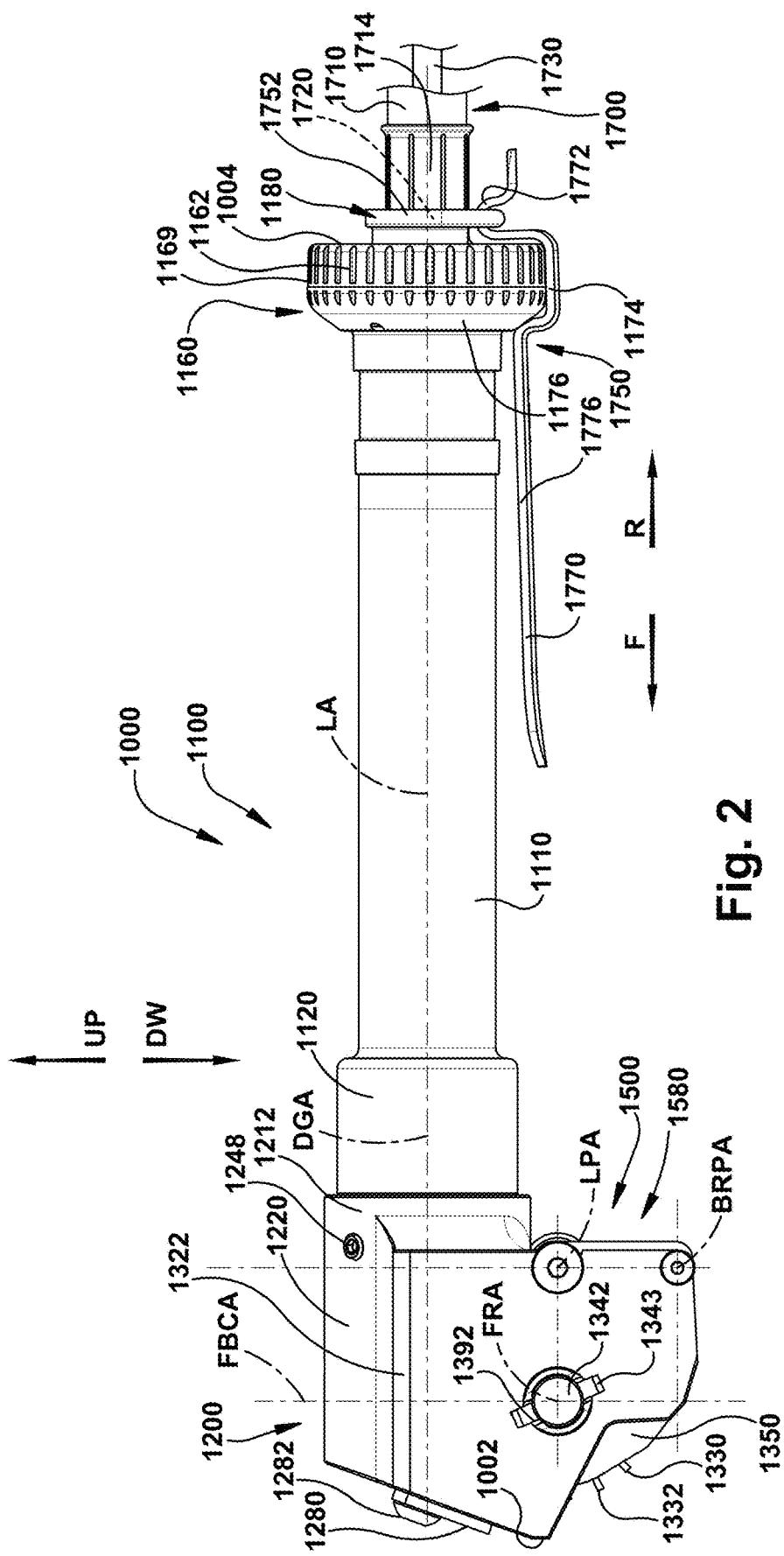
FIG. 2 is a schematic side elevation view of a portion of the power operated trimming tool assembly of FIG. 1 including the power operated trimming tool and a portion the flexible shaft drive transmission including a drive disengagement assembly at a distal end portion of the flexible shaft drive transmission.

As best seen in FIGS. 2 and 3, when the driver assembly 1716 of the tool end coupling 1714 is releasably coupled to the handle assembly 1100 via the driver retainer assembly 1160 of the handle assembly 1100 and an engagement lever 1770 of a drive engagement assembly 1750 of the flexible shaft drive transmission 1700 is pivoted to an operating position 1780 that is generally parallel with the handle body 1110, the drive fitting 1734 of the flex shaft 1730 engages and is received in a driven fitting 1630 at a distal end portion of the drive gear 1602 of the drive mechanism 1600. Rotation of the motor fitting of the electric motor 1800 causes rotation of the flex shaft 1730, including the driven fitting 1732 and the drive fitting 1734 about the longitudinal central axis LCA of the shaft drive transmission 1700. The rotation of the drive fitting 1734, in turn, causes rotation the drive gear 1602 of the drive mechanism 1600 about the drive gear axis of rotation DGA. In one exemplary embodiment, the drive gear 1602 (FIGS. 3 and 10) includes a worm or worm screw or worm gear driver 1620 at a distal end portion 1604 of the drive gear 1602 and a driven fitting 1630 at a proximal end portion 1606 of the drive gear 1602. The worm gear driver 1620 at a distal end portion 1604 of the drive gear 1602 operatively engages the worm wheel 1325 formed on the central portion 1320 of the outer surface 1312 of the feed roll 1302.

The driven fitting 1630 is sized to receive the drive fitting 1734 of the flex shaft 1730. When the drive fitting 1724 of the flex shaft 1730 is operatively engaged with the driven fitting 1630 of the drive gear 1602, rotation of the flex shaft 1730 rotates drive gear 1602 about the drive gear axis of rotation DGA. Rotation of the worm gear driver 1620, in turn, helically drives the worm wheel 1325 of the feed roll 1302 causing rotation of the feed roll 1302 of the feed roll assembly 1300 about the feed roll axis of rotation FRA.

The drive gear 1602 is advantageously supported within the handle extension 1120 of the handle assembly 1100 by a shaft support assembly 1680. The shaft support assembly 1680 advantageously includes two longitudinally spaced apart bearing supports defined by a first distal bearing support assembly 1682 and a second proximal bearing support assembly 1684 which support an intermediate shaft 1610 of the drive gear 1602. The longitudinally spaced bearing supports of the drive gear 1602 provided by the first and second bearing support assemblies 1682, 1684 bear against and support a central, cylindrical body 1611 of the intermediate shaft 1610. As can best be seen in FIG. 3, the bearing two longitudinally spaced apart bearing support assemblies 1682, 1684 are advantageously are located about a longitudinal center point of the drive gear 1602 to provide for additional stability in the bearing support afforded by the assemblies 1682, 1684. The first and second bearing supports assemblies 1682, 1684 provide for improved rotational support of the drive gear 1602, less chatter and/or undesirable radial movement of the drive gear 1602 under certain load conditions, as opposed to using a single bearing support means. Chatter and undesirable radial movement of the drive gear 1602 would be typically experienced by the operator as undesirable vibration of the trimming tool 1000, premature component wear, and/or excessive heating of components. In one exemplary embodiment, the first and second bearing support assemblies 1682, 1684 are ball bearing support assemblies. In lieu of ball bearing support assemblies, as would be recognized by one of skill in the art, sleeve bushings may be utilized. When the flexible shaft drive transmission 1700 is operatively coupled between the motor 1800 and the drive mechanism 1600 of the power operated trimming tool 1000, the handle assembly longitudinal axis LA, the flexible shaft drive transmission central longitudinal axis LCA and the drive gear axis of rotation DGA are substantially aligned and coincident in a region of the handle assembly 1100, while the feed roll axis of rotation FRA is offset vertically from the handle assembly longitudinal axis as measured along the frame body central axis FBCA and is substantially orthogonal to the handle assembly longitudinal axis LA.

Advantageously, as best seen in FIGS. 7-10, the power operated trimming tool 1000 of the present disclosure includes the blade retainer assembly 1500 which allows removal of a used fixed blade 1400 and insertion of a new fixed blade 1400 onto the blade support assembly 1250 by means of a rear or back loading of the blade 1400. The blade support assembly 1250 includes the lower blade support ledge 1260 and an upper blade cover or centering band 1270 which defines a blade support slot 1256 therebetween. Loading and unloading of the fixed blade 1100 is accomplished by use of a rectangular blade receiving opening 1258 at a rearward end of the blade support slot 1256. The blade retainer assembly 1500 moves or pivots between two positions or states: a) a first, blade retaining position 1580 (FIGS.

Figure 9:
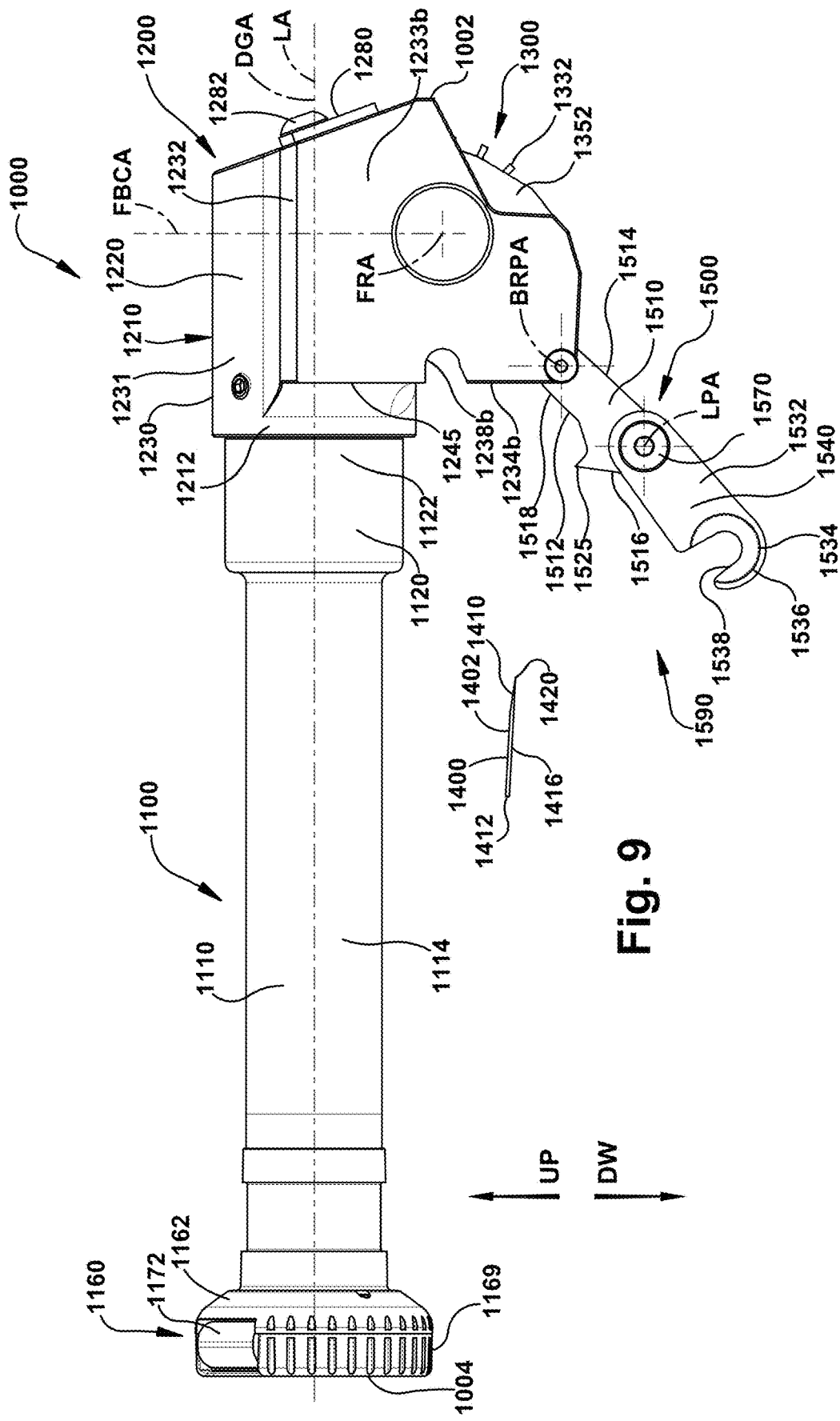
FIG. 9 is a schematic side elevation view of the power operated trimming tool of FIG. 1, with the blade retainer assembly in the second blade changing position and with the blade removed from the blade support.

2-7); and b) a second, blade changing position 1590 (FIGS. 8-9). The blade retainer assembly 1500 includes a blade retainer plate 1510 including a first, inner wall 1512 and a second, outer wall 1514. The blade retainer plate 1510 extends between the first and second side walls 1233*a*, 1233*b* of the support portion 1220 of the frame body 1210 and is pivotally coupled to the frame body 1210 to pivot about a blade retainer plate pivot axis BRPA. The blade retainer plate pivot axis BRPA is offset from and substantially orthogonal to the handle assembly longitudinal axis LA and is offset from and substantially parallel to the feed roll axis of rotation FRA. Advantageously, the lower blade support ledge 1260 of the blade support assembly 1250 is a part of the unitary, one-piece frame body 1210. Specifically, a cross member 1240 extending between the first and second side walls 1233*a*, 1233*b* of the frame body 1210 defines the lower blade support ledge 1260. Thus, the lower blade support ledge 1260 of the blade support assembly 1250 is integral with and part of the unitary, one-piece frame body 1210 and thus advantageously provides a secure and stable blade seating surface for the blade 1400. That is, the blade 1400, when mounted in the blade support slot 1256 of the blade support assembly 1250 advantageously rigidly and non-movably supported by the frame body 1210, specifically the frame body cross member 1240 which extends between the fixed first and second side walls 1233*a*, 1233*b* of the frame body 1210. Advantageously, the blade retainer plate 1510 pivots to allow access to the blade 1400, while the blade remains fixed with respect to the frame body 1210 and rigidly supported by the frame body 1210. Thus, when inserted in the blade support slot 1256, the blade 1400 remains in a fixed portion with respect to the feed roll 1302 of the feed roll assembly 1300, the drive mechanism 1600 and the side walls 1233*a*, 1233*b* of the frame body 1210. That is, the frame body 1210, including the blade support cross member 1240 is a unitary, one-piece, integral component with great strength and structural rigidity. As the frame body cross member 1240 is a part of the blade support assembly 1250, the blade 1400 is seated on the cross member 1240. Thus, the blade 1400 is rigidly affixed to and directly supported by the unitary, one-piece frame body 1210. Given the significant cutting forces applied to the blade 1400 during cutting and trimming operations, i.e., when the cutting edge 1420 of the blade 1400 impacts a bone of the workpiece, the additionally strength and rigidity provided by the blade support structure 1250 wherein the blade 1400 is supported along the entirety of its lateral extent between the first and second lateral sides 1414, 1416 of the blade 1400 by the cross member 1240 of the unitary, one-piece frame body 1210 is an advantageous feature of the power operated trimming tool 1000 of the present disclosure.

In the first, blade retaining position 1280 (FIGS. 2-7), the blade retainer plate 1510 is positioned in proximity to the blade receiving opening 1258 of the blade support slot 1256 of the blade support assembly 1250 and, in the second, blade changing position 1590 (FIGS. 8 and 9), the blade retainer plate 1510 is pivoted away from rearward facing surfaces 1234*a*, 1234*b* of the first and second side walls 1233*a*, 1233*b* of the frame body support portion 1220 such that the blade retainer plate 1510 is spaced from the blade receiving opening 1258 of the blade support assembly 1250 thereby allowing access to the back side 1412 of the blade 1400. That is, the blade receiving opening 12586 of the blade support assembly 1250 is accessible from a back opening 1246 of the support portion 1220 when the blade retainer assembly 1500 is moved to the second, blade changing position 1590. The back opening 1246 is located below the rear wall 1245 of the support portion 1220 and between the first and second side walls 1233*a*, 1233*b*. The loading of the blade 1400 from the back opening 1245 is advantageous for a number of reasons including: a) loading from the back opening 1245 mitigates the likelihood of damage to the cutting edge 1420 of the blade 1400 which is located along the forward side 1410 of the blade 1400; and b) since the blade 1400 is loaded from the back opening, the operator grasps a back portion of the blade 1400, thus, the operator's fingers are not exposed to the cutting edge 1420 extending along the forward side 1410 of the blade 1400.

As used herein and as best seen in FIG. 2, the forward direction F is a direction along or parallel to the handle assembly longitudinal axis LA toward the distal end 1002 of the power operated trimming tool 1000, while the rearward direction R is opposite the forward direction F. The upward direction UP is along or parallel to the frame body central axis FBCA in a direction toward the upper wall 1230 of the support portion 1220 of the frame body 1210, while the downward direction DW is opposite the upward direction UP.

Handle Assembly 1100

In one exemplary embodiment, as best seen in FIGS. 2-3, 5-7 and 12, the handle assembly 1100 includes the handle body 1110, the handle extension 1120 and the driver retainer assembly 1160. As best seen in FIGS. 3 and 10, the handle body 1110 includes a threaded end portion 1113 formed on reduced diameter proximal end portion 1112 of the handle body 1110. The cylindrical central portion 1114 of the handle body 1110 is configured to receive a hand piece (not shown) which would be grasped by the hand of the operator to manipulate the power operated trimming tool 1000 for cutting and trimming operations on a workplace.

Figure 12:
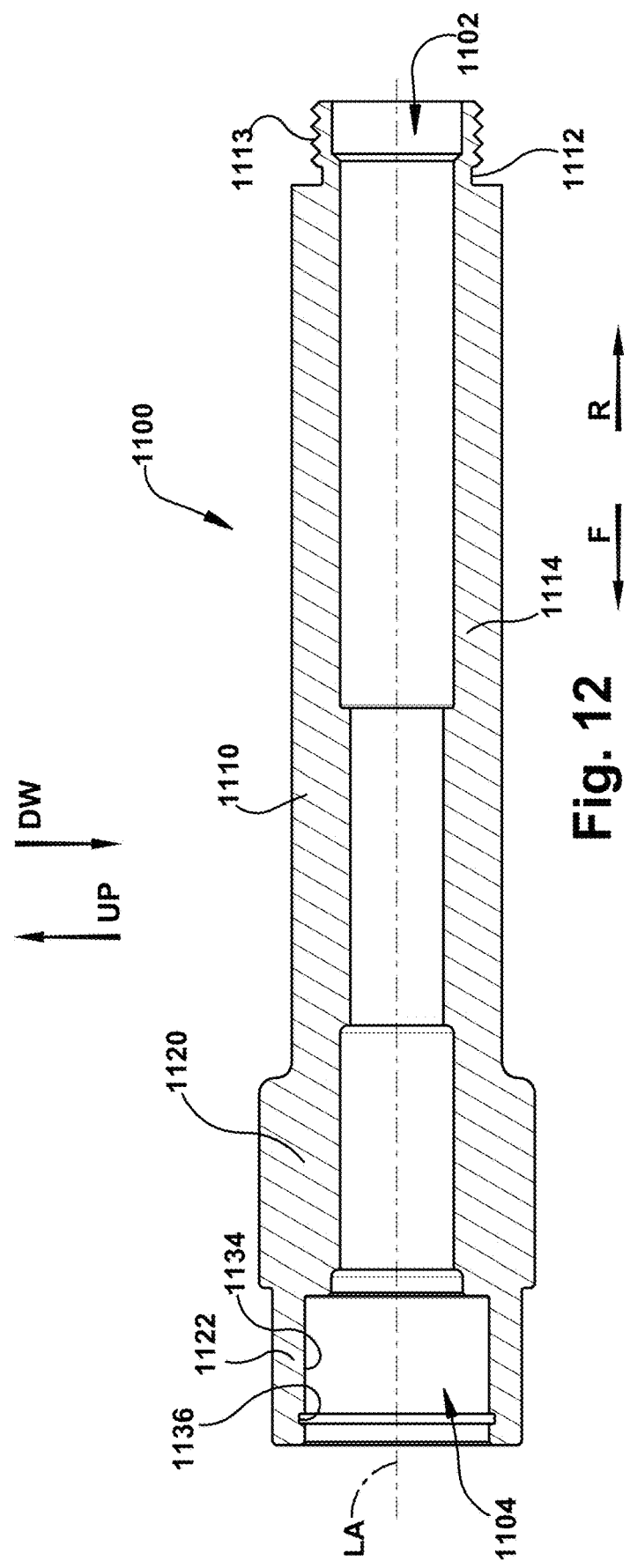
FIG. 12 is a schematic longitudinal section view of a handle body of the handle assembly of the power operated trimming tool of FIG. 1.

As best seen in FIG. 12, the handle extension 1120 extends distally from the handle body and includes a reduced diameter distal end portion 1122. The reduced diameter end portion 1122 is sized to be snugly received in the interface portion 1212 of the frame body 1210 and, more specifically, to be snugly received in a throughbore 1214 defined by the interface portion 1212. An outer surface 1216 of the interface portion 1212 includes a pair of threaded openings 1218 that extend from the outer surface 1216 to the throughbore 1214. A pair of set screws 1248 are threaded through the openings 1218 of the frame body 1210 and contact and bear against an outer surface 1124 of the distal end portion 1122 of the handle extension 1120 to secure the head assembly 1200 to the handle assembly 1100. An inner surface 1130 of the handle extension 1120 defines a forward portion 1104 of the handle assembly throughbore 1102. A distal section 1132 of the inner surface 1130 of the handle extension 1120 defines a bearing seating region 1134 which receives and supports the shaft support assembly 1680. As mentioned above, in one exemplary embodiment, the shaft support assembly 1680 includes the first distal bearing support assembly 1682 and the second proximal bearing support assembly 1684. The first and second bearing support assemblies 1682, 1684 are received in the bearing seating region 1134 of the handle extension 1120. As can best be seen in FIG. 3, the inner surface 1130 of the handle extension 1120 also includes art annular groove 1136 adjacent the bearing seating region 1134 that receives a retaining ring 1690 of the shaft support assembly 1680 to maintain the first and second bearing support assemblies 1682, 1684 in place.

The driver retainer assembly 1160 of the handle assembly 1100 and the drive engagement assembly 1750 of the flexible shaft drive transmission 1700 work together to provide for an operative coupling of the driver assembly 1716 of the shaft drive transmission 1700 and the handle assembly 1100. Specifically, the driver retainer assembly 1160 secures the driver assembly 1716 within the throughbore 1102 of the handle assembly 1100 while the drive engagement assembly 1750 requires the operator to depress or pivot a gripping portion 1776 of an engagement lever 1770 of the drive engagement assembly 1750 such that the gripping portion 1776 of the lever 1770 is substantially parallel to the handle assembly longitudinal axis LA. This is referred to as the engaged or operating position 1780 of the engagement lever 1770 of the drive engagement assembly 1750. When the gripping portion 1776 of the engagement lever 1770 is pivoted into the operating position 1780, contact between a generally u-shaped portion 1774 of the engagement lever with a corresponding inclined front surface 1176 of an outer surface 1169 of the knob 1162 of the driver retainer assembly 1160 cause the driver assembly 1716 to move in the forward direction F or advance a short distance within the handle assembly throughbore 1102. The advancement of the driver assembly 1716 within the handle assembly throughbore 1102 results in an operative engagement of the drive fitting 1734 of the rotating flex shaft 1730 with a driven fitting 1630 of the drive gear 1602 of the drive mechanism 1600 of the power operated trimming tool 1000 to thereby cause rotation of the feed roll 1302 about its axis of rotation FRA.

If the operator of the power operated trimming tool 1000 releases the gripping portion 1776 of the lever 1770 of the drive engagement assembly 1750, the gripping portion 1776 pivots outwardly from the handle body 1110 to a disengagement position 1782 allowing the driver assembly 1715 to move a short distance in the rearward direction R within the handle assembly throughbore 1102 such that the drive fitting 1734 of the flex shaft driven fitting 1630 disengages from the driven fitting 1630 of the drive gear 1602 due to a biasing spring 1718 of the driver assembly 1716. Thus, in the disengagement position 1782 of the lever gripping portion 1776, no rotational power is supplied to the drive gear 1602 of the drive mechanism 1600 to rotate the feed roll 1302. However, advantageously, because of the driver retainer assembly 1160, the driver assembly 1716 remains in place within the handle assembly throughbore 1002, even when the lever 1770 is released. To remove the driver assembly 1716 from the handle assembly throughbore 1002, the operator must press on an actuation surface 1172 of a latch 1170 of the driver retainer assembly 1160 to permit the driver assembly 1716 to be moved in the rearward direction R away from the handle assembly 1100.

The driver retainer assembly 1160 extends from a proximal end portion of the handle body 1110 and includes a knob 1162 defining a throughbore 1164. The throughbore 1164 is aligned with and part of the throughbore 1102 of the handle assembly 1100. In one exemplary embodiment, the knob 1162 includes a front half 1166, that is received on the reduce diameter proximal end portion 1112 of the handle body 1110, and a rear half 1168. The front and rear halves 1166, 1168 are held together by a pair of threaded fasteners 1174. Defined between facing surfaces of the front and rear halves is a recess 1167 which slidingly receives the latch 1170. The latch 1170 includes a central opening 1171 and is biased by a pair of springs to slide or move the latch 1170 to a locked position. The central opening 1171 of the latch 1170 is aligned with the throughbore 1164 of the knob 1162 and allows passage of the driver assembly 1716 of the tool end coupling 1714 of the flexible shaft drive transmission 1700 into the handle assembly throughbore 1102. In the locked position, the central opening 1171 of the latch 1170 is slightly misaligned with the throughbore 1164 of the knob 1162 thereby causing a portion of a peripheral surface 1178 of the latch 1170 defining the latch opening 1171 to bear against shoulder 1720 of the driver assembly 1716. This interference between the driver assembly shoulder 1720 and the latch 1170 maintains the driver assembly 1716 within the handle assembly throughbore 1102. A radially extending outer surface of the latch 1170 defines an exposed actuation surface 1172 that is accessible in via a slot in an outer surface 1169 of the knob 1162. When the operator pushes on the actuation surface 1172 of the latch 1170, the latch opening 1171 is aligned with the knob throughbore 1164 and the driver assembly 1716 may be completely removed from the handle assembly 1100 by moving the driver assembly in the rearward or proximal direction R.

Drive Mechanism 1600

As best seen in FIGS. 3 and 10, in one exemplary embodiment, the drive mechanism 1600 comprises the drive gear 1602 which supported for rotation about the drive gear axis of rotation DGA by the shall support assembly 1680, The drive gear 1602 includes the central intermediate shaft 1610, the worm gear driver 1320 at the distal end portion 1604 of the drive gear 1602 and the driven fitting 1630 at the proximal end portion 1606 of the drive gear 1602. In one exemplary embodiment, a distal portion 1612 of the intermediate shaft 1610 includes an exterior threaded region 1613 and the worm gear driver 1620 is fabricated as a separate component. The worm gear driver 1620 includes a mating threaded central opening 1622. The threaded central opening 1622 of the worm gear driver 1620 threads onto the threaded region 1613 of the intermediate shaft 1610 to secure the worm gear driver 1620 to the intermediate shaft 1610. The worm gear driver 1620 includes a disk-shaped locating plate 1624 which abut a shoulder 1618 of the intermediate shaft 1610 proximal to the threaded region 1613 to positively locate the worm gear driver 1620 with respect to a longitudinal extent of the intermediate shaft 1610.

In one exemplary embodiment, the driven fitting 1630 is formed as a socket in an enlarged diameter, proximal end portion 1614 of the intermediate shaft 1610. The intermediate shaft 1610 includes a central cylindrical body 1611 which is received in the shaft support assembly 1680 to support the drive gear 1602 for rotation about the drive gear axis of rotation DGA. In one exemplary embodiment, the shaft support assembly 1680 advantageously includes the first distal bearing support assembly 1682 and the second proximal bearing support assembly 1684 which support the central cylindrical body 1611 of the intermediate shaft 1610 of the drive gear 1602. In one exemplary embodiment, the first and second bearing support assemblies 1682, 1684 are ball bearing support assemblies and are supported in the bearing seating region 1134 of a distal section 1132 of an inner surface 1130 of the handle extension 1130 of the handle assembly 1100. Advantageously, by locating the first and second bearing support assemblies 1682, 1684 within the handle throughbore 1102, as opposed to the frame body 1210, and locating the driver assembly 1716 of the tool end coupling 1714 within the handle throughbore 1102, precise longitudinal alignment of the drive gear axis of rotation DGA and the flex shaft axis of rotation FSA, which avoid undesirable premature component wear, trimming tool chatter and vibration problems that are associated with a misalignment of the drive gear axis of rotation DGA and the flex shaft axis of rotation FSA.

Frame Body 1210

Figure 7:
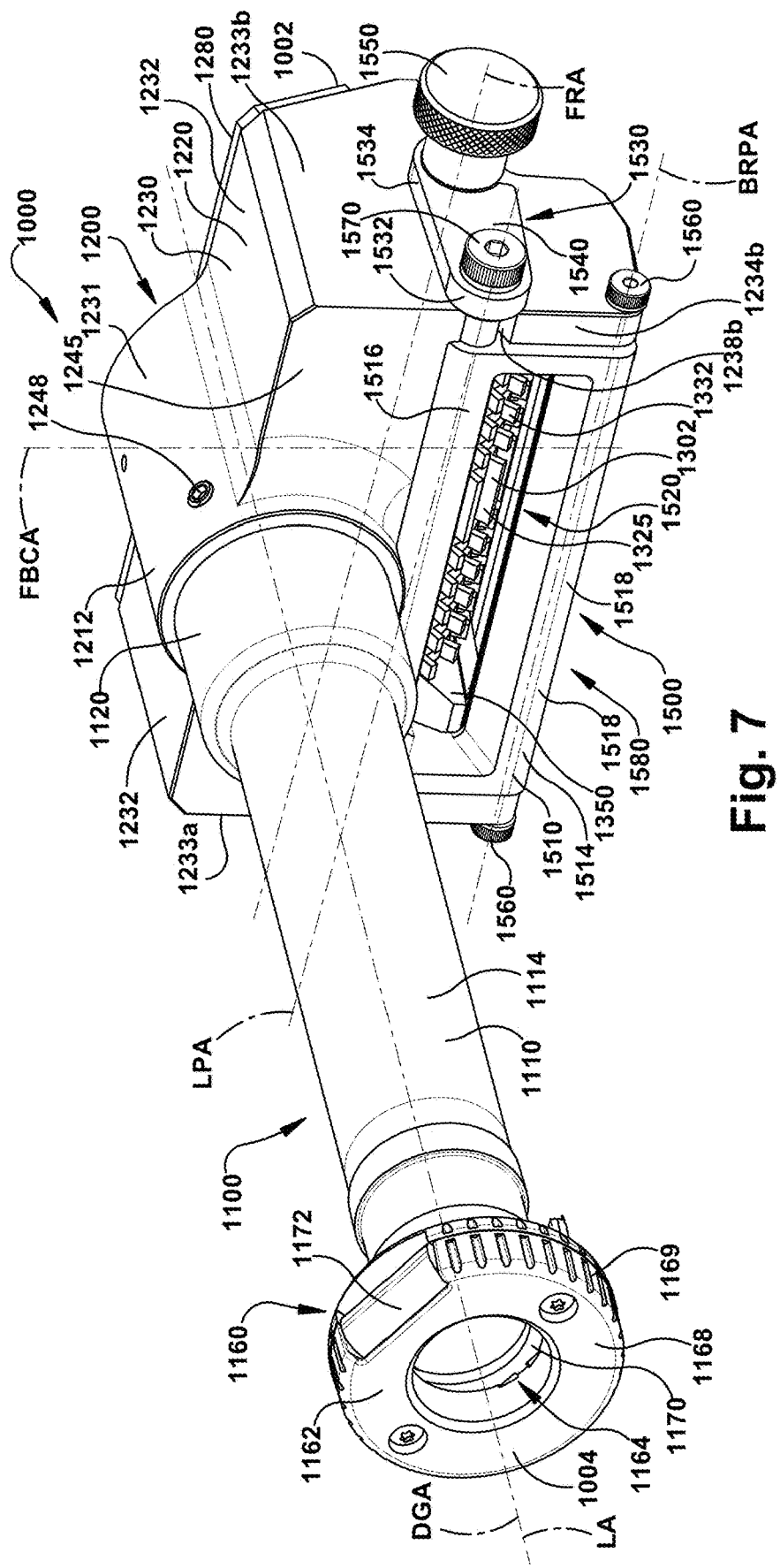
FIG. 7 is a schematic top, rear perspective view of the power operated trimming tool of FIG. 1, with the blade retainer assembly in the first blade retaining position.
Figure 11:
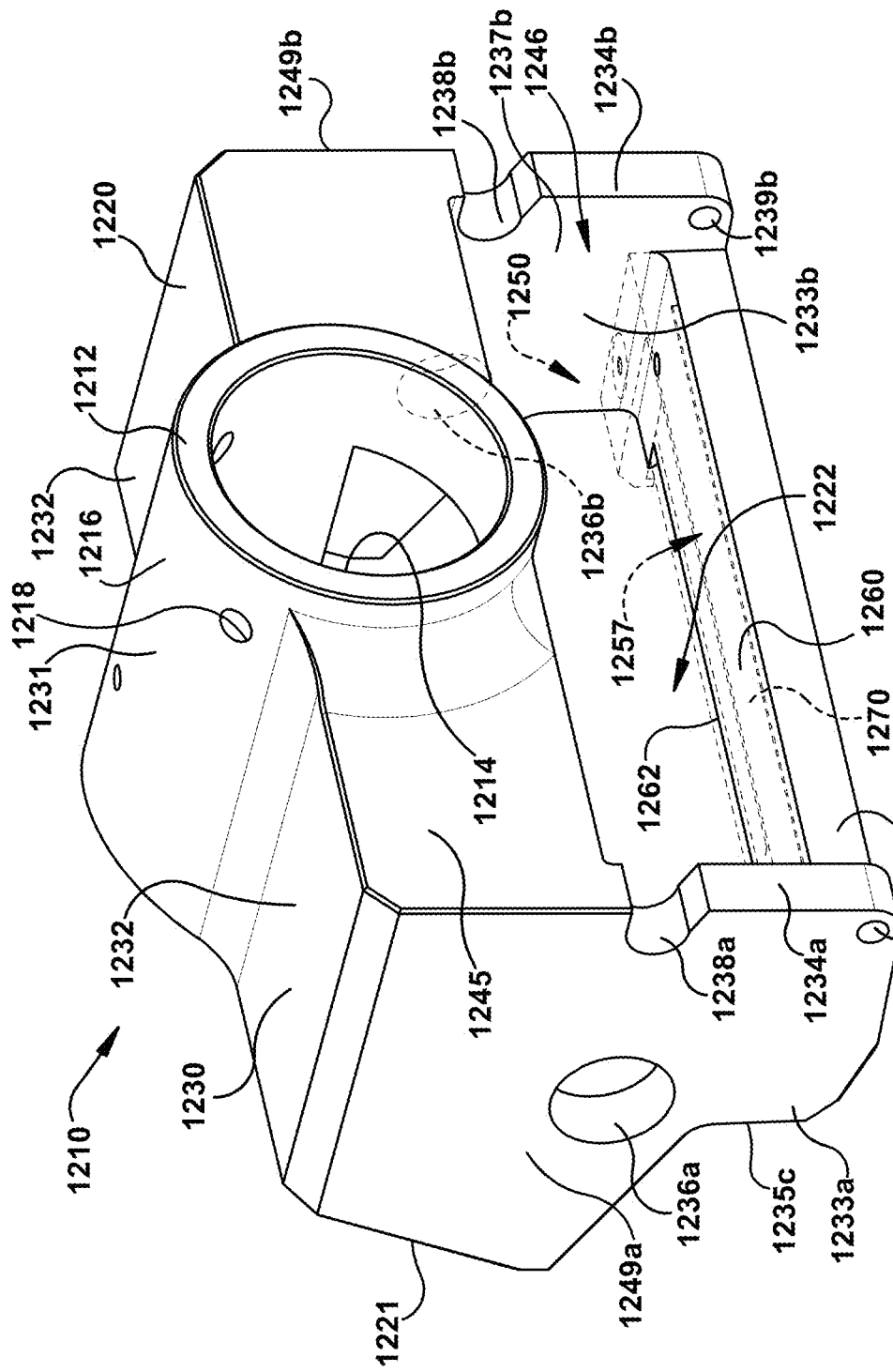
FIG. 11 is a schematic top, rear perspective view of the frame of the power operated trimming tool of FIG. 1 with the blade and an upper blade cover of the blade support shown in dashed line.

As best seen in FIGS. 3, 7 and 11, the frame body 1210 is coupled to the distal end portion 1106 of the handle assembly 1100 and includes the interface portion 1212, which is coupled to the handle assembly 1100, and the support portion 1220. The support portion 1220 of the frame body 1210 supports the fixed blade 1400 via the blade support assembly 1250 (FIGS. 8, 10-11 and 13). The support portion 1220 also supports the feed roll assembly 1300 and the blade retainer assembly 1500, which pivots with respect to the frame body 1210 between the first blade retaining position 1580 of the blade retainer plate 1510 and the second blade changing position 1590 of the blade retainer plate 1510. The interface portion 1212 of the frame body 1210 defines a throughbore 1214. As can best be seen in FIG. 3, the throughbore 1214 is received on the cylindrical, reduced diameter distal end portion 1122 of the handle extension 1120 of the handle assembly 1100. A pair of threaded set screws 1248 extend through the pair of threaded openings 1218 from the outer surface 1216 to the throughbore 1214 and, when fully tightened, bear against the outer surface 1124 of the distal end portion 1122 of the handle extension 1120 to secure the head assembly 1200 to the handle assembly 1100. As can be seen in FIG. 3, when viewed along the handle assembly longitudinal axis LA, the first and second bearing support assemblies 1682, 1684 are located within the throughbore 1214 of the interface portion 1212, as is a portion of the shaft cylindrical body 1611 of the drive gear 1602.

As best seen in FIG. 11, the support portion 1220 of the frame body 1210 includes the upper wall 1230, the spaced apart first and second side walls 1233a, 1233b, the rear wall 1245 extending from the upper wall 1230 and extending a portion of the way down the first and second side walls 1233a, 1233b and the cross member 1240 extending between respective lower portions 1235a, 1235b of the first and second side walls 1233a, 1233b. A front cover 1280 is affixed to a front or forward region 1221 of the support portion 1220 of the frame body 1210 by a pair of threaded fasteners 1282. The front cover 1280 extends between respective forward facing surfaces of the first and second side wall 1233a, 1233b and downwardly from the upper wall 1230. The support portion 1220 and the front cover 1280 define an interior region 1222 of the support portions 1220. The upper wall 1230 of the support portion 1220 includes an upwardly protruding, dome-shaped central portion 1231, which, as can be seen in FIG. 3, provides clearance for the worm gear driver 1620 extending into the interior region 1222. On either side of the dome-shaped central portion 1231, the upper wall 1230 includes generally planer flanking portions 1232 of the upper wall 1230. The first and second side walls 1233a, 1233b include rearward facing surfaces 1234a, 1234b that are below or in the downward direction DW a lower edge of the rear wall 1245 of the support portion 1220. The rearward facing surfaces 1234a, 1234b of the first and second side walls 1233a, 1233b include arcuate recesses 1238a, 1238b that receive respective latch fasteners 1570 of the blade retainer assembly 1500. The latch fasteners 1570 thread into respective threaded openings 1517 in an upper portion 1516 of the blade retainer plate 1510 and bear against respective portions of outer surfaces 1249a, 1249b of the first and second side walls 1233a, 1233b adjacent the arcuate recess 1238a, 1238b to maintain the blade retainer plate 1510 in the first blade retaining position 1580 of the blade retainer assembly 1500.

Located generally centrally in the first and second side walls 1233a, 1233b are a pair of circular openings 1236a, 1236b in the first and second side walls 1233a. 1233b that receive respective press fit bushings 1380, 1382 of a shaft 1330 that supports the feed roll shaft 1340 of the feed roll assembly 1300. The feed roll 1302 is mounted on the feed roll shaft 1340. Positioned between the first and second ends 1316, 1318 of the feed roll 1302 and inwardly facing surfaces 1237a, 1237b of the first and second side walls 1233a, 1233b are the first and second c-shaped spacers 1350, 1352 which center the feed roll 1302 on the feed roll shaft 1340. Respective lower portions 1235a, 1235b of the first and second side walls 1233a, 1233b include respective threaded openings 1239a, 1239b that receive threaded fasteners 1560 of the blade retainer assembly 1500. The fasteners 1560 thread into respective threaded openings 1519 in a lower portion 1518 of the blade retainer plate 1510 to pivotally secure the blade retainer plate 1510 to the first and second side walls 1233a, 1233b of the frame body 1210. The threaded openings 1239a, 1239b of the first and second side walls 1233a, 1233b and the threaded fasteners 1560 define the blade retainer plate pivot axis BRPA. As explained previously, the blade retainer plate 1510 extends between the first and second side walls 1233a, 1233b of the support portion 1220 of the frame body 1210 and is pivotally coupled to the frame body 1210 to pivot about the blade retainer pivot axis BRPA. In the first, blade retaining position 1280, the blade retainer plate 1510 is positioned in proximity to the blade receiving opening 1258 of the blade support slot 1256 of the blade support assembly 1250 and, in the second, blade changing position 1590, the blade retainer plate 1510 is pivoted away from the rearward facing surfaces 1234a, 1234b of the first and second side walls 1233a, 1233b of the frame body support portion 1220 such that the blade retainer plate 1510 is spaced from the blade receiving opening 1258 of the blade support assembly 1250 thereby allowing access to the back side 1412 of the blade 1400. In the first, blade retaining position 1280, the blade retainer plate 1510 overlies the back opening 1246 of the support portion 1220 of the frame body 1210 that is located below the rear wall 1245 and between the first and second side walls 1233a, 1233b.

The frame body 1210 further includes the cross member 1240 which extends horizontally between the inwardly facing surfaces 1237a, 1237b of the first and second side walls 1233a, 1233b. The cross member 1240 is part of a blade support assembly 1250. As noted previously, since the frame body cross member 1240 is a part of the blade support assembly 1250 and the blade 1400 is seated on the cross member 1240 along an entirety of its lateral extent between the first and second lateral sides 1414, 1416 of the blade 1400, the blade 1400 is advantageously rigidly fixed to and directly supported along an lateral extent by the support portion 1220 of the unitary, one-piece frame body 1210. The blade support assembly 1250 includes a forward portion 1252 that supports a forward side 1410 of the blade 1400 and a rearward portion 1254 that supports the rearward or back side 1412 of the blade 1400. The forward side 1410 of the blade 1400 includes the cutting edge 1420 of the blade 1400. As can best be seen in FIG. 13, the forward portion 1252 of the blade support assembly 1250 is recessed rearwardly from the cutting edge 1420 of the blade 1400 such that the cutting edge 1420 is exposed for cutting the workpiece, as the workpiece is fed in the direction of the cutting edge 1420 by rotation of the feed roll 1302 about the feed roll axis of rotation FRA. The blade support assembly 1250 defines a blade support slot 1256 that receives, positions, and supports the blade 1410. As explained above, loading and unloading of the fixed blade 1400 is accomplished by use of the rectangular blade receiving opening 1258 at a rearward end of the blade support slot 1256 when the blade retainer plate 1510 of the blade retainer assembly 1500 is in the open or blade changing position 1590.

The cross member 1250 of the frame body 1210 defines a lower blade support ledge 1260 of the blade support assembly 1250. As seen in FIG. 13, the lower blade support ledge 1260 includes a forward edge 1262 which supports the blade forward side 1410. The forward edge 1262 of the lower blade support ledge 1260 is recessed rearwardly from the cutting edge 1420 of the blade 1400 and from forwardly extending surfaces 1235c of the lower portions 1235a, 1235b of the first and second side walls 1233a, 1233b. The blade support assembly 1260 also includes the upper blade cover or centering hand 1270. The upper blade cover 1270 is secured to the lower blade support ledge 1260 by a pair of fasteners 1278 that extend though openings in opposite side of the upper blade cover 1270 and thread into aligned threaded openings in an, upper surface of the lower blade support ledge 1260 defined by the cross member 1250. A lower surface 1274 of the upper blade cover 1270 includes a slot 1272. When the upper blade cover 1270 is affixed to the lower blade support ledge 1260, the slot 1272 of the upper blade cover 1270 defines a blade seating region 1257 of the blade support assembly 1250 disposed between the lower blade support ledge 1260 and the upper blade cover 1270, Stated another way, the slot 1272 of the upper blade cover 1270 defines a gap between the lower blade support ledge 1260 and the upper blade cover 1270 that is the blade support slot 1256 of the blade support assembly 1250. The upper blade cover 1270 further includes a pair of forwardly extending arms 1276 at opposite sides 1275 of the cover 1270. Forward portions of the extending arms 1276 of the upper blade cover 1270 include respective blade constraint tabs 1277 that extend downwardly to contact the lower blade support ledge 1260 and thereby limit or constrain the blade 1400 from forward movement within the blade support slot 1256. The tabs 1277 essentially define the forward edge of the blade support slot 1256, that is, the tabs 1277 contact the forward side 141 of the blade 1400 adjacent the first and second lateral sides 1414, 1416 of the blade 1400 to limit forward movement of the blade 1400 within the blade support slot 1256.

Feed Roll Assembly 1300

As best seen in FIGS. 4-7, 10 and 13, the feed roll assembly 1300 is supported by the first and second side walls 1233a, 1233b of the frame body 1210 and includes the generally cylindrical feed roll 1302 supported for rotation about the feed roll axis of rotation ERA by the feed roll shaft 1340. The feed roll assembly 1300 farther includes the first and second c-shaped spacers 1350, 1352 that are interposed between the respective first and second ends 1316, 1318 of the feed roll 1302 and the respective inward facing surfaces 1237a, 1237 of the first and second side walls 1233a, 1233b of the support portion 1220 of the frame body 1210. In one exemplary embodiment, the feed roll 1302 includes the inner surface 1310, defining the throughbore 1314, and a radially spaced apart outer surface 1312. The feed roll shaft 1340 extends though the throughbore 1314 and the feed roll 1302 is rotated on the feed roll shaft 1340 by the drive gear 1602 of the drive mechanism 1600. The outer surface 1312 of the feed roll 1302 includes the central portion 1320 which defines the outwardly protruding worm wheel 1325. The worm wheel 1325, which, in one exemplary embodiment is essentially is spur gear, is operatively engaged by the worm gear driver 1620, which essentially is a helical gear, of the drive gear 1602 and, as the drive gear rotates about the drive gear axis of rotation DGA, the feed roll 1302 is rotationally driven about its axis of rotation FRA. The worm wheel 1325 includes a plurality of circumferentially spaced apart gear teeth 1326 (FIG. 13).

The extending between the central portion 1320 of the outer surface 1312 of the feed roll 1302 and the first and second ends 1316, 1318 are flanking portions 1322, 1324. The flanking portions 1322, 1324 include a plurality of projections 1335. In one exemplary embodiment, the plurality of projections 1335 comprise a plurality of parallel, circumferential sets 1332. Each of the plurality of sets 1332 include a plurality of circumferentially spaced, outwardly extending teeth 1332. For each of the circumferential sets 1332, there are the same number of teeth 1332 and the teeth 1332 are aligned circumferentially, as can best be seen in FIG. 13. With respect to the outer surface 1312 of the feed roll 1302, as noted above, there are actually two different diameter outer surfaces comprising the outer surface 1312. First, there is a first, maximum outer diameter OD1 (FIG. 3) defined by the distal or outer surfaces 1333 of the plurality of circumferentially spaced outwardly extending teeth 1332 located in the flanking portions 1322, 1324. This is the first maximum diameter OD1 of the outer surface 1312 defined by the extending outer surface 1312a. Second, there is a second, smaller or minimum diameter OD2 defined by surface portions of the outer surface 1312 in the flanking portions 1322, 1324 other than those defined by the plurality of circumferentially spaced outwardly extending teeth 1332. This is the second minimum diameter OD2 of the outer surface 1312 defined by the base outer surface 1312b. The first, maximum outer diameter OD1 of the outer surface 1312 of the feed roll 1302 is, of course, larger in magnitude than the second, minimum outer diameter OD2 of the feed roll outer surface 1312 in the first and second flanking portions 1322, 1324.

These same maximum and minimum diameters OD1, OD2 of the outer surface 1312 of the feed roll 1302 are also uniform and applicable in the region of the central portion 1320 of the feed roll 1302 defining the worm wheel 1325. In the central portion 1320, the outer surface of the worm wheel 1325 includes a base outer surface 1325b (having an outer diameter of OD2) and a gear tooth outer surface 1325a defined by distal outer surfaces 1326a of the circumferentially spaced gear teeth 1326 (having an outer diameter of OD1). Because the first maximum outer diameter OD1 of the extending outer surface 1312a is substantially constant or uniform between the first and second ends 1316, 1318 of the feed roll 13022 the maximum outer diameter OD1 defines a cylindrical surface when viewed from the first end 1316 to the second end 1318 of the feed roll 1302. Similarly, because the second minimum outer diameter OD2 of the base outer surface 1312a is substantially constant or uniform between the first and second ends 1316, 1318 of the feed roll 1302, the minimum outer diameter OD2 also defines a cylindrical surface (albeit a smaller diameter cylindrical surface) when viewed from the first end 1316 to the second end 1318 of the feed roll 1302. Having the distal outer surfaces 1326a of the plurality gear teeth 1326 at the same first maximum outer diameter OD1 as the distal outer surfaces 1333 of the plurality of teeth 1312 advantageously allows the gear teeth outer surfaces 1326a to function similarly as the plurality of gear teeth 1332 in terms of contacting the outer surface of the workpiece and, as the feed roll 1302 is rotated about its axis of rotation FRA, urging the workpiece toward the cutting edge 1420 of the blade 1400 to facilitate trimming the outer layer of tissue from the workpiece, as previously explained.

As can best be seen in FIG. 10, the feed roll shaft 1340 includes a main cylindrical portion 1341 and a reduced diameter end portion 1344. The reduced diameter end portion 1344 includes a threaded exterior end portion 1346. At least a region of the threaded exterior end portion 1346 extends outwardly beyond the outward facing surface 1249b of the second side wall 1233b. Similarly an end portion 1342 of the cylindrical portion 1341 of the feed roll shall 1340 extends outwardly beyond the outward facing surface 1249a of the first side wall 1233a. The feed roll shaft 1340 is supported by the first and second bushings 1380, 1382 that are press fit into the first and second circular openings 1236a, 1236b in the first and second side walls 1233a, 1233b. The first bushing 1380 includes a smaller portion 1384 that is press fit into the first circular opening 1236a, while the second bushing 1382 includes a smaller portion 1386 that is press fit into the second circular opening 1236b. The smaller portion 1384 of the first bushing 1380 includes an outer portion that extends outwardly of the first side wall 1233a. The outer portion of the first bushing 1380 includes a recess 1392 that receives a non-rotation pin 1343. The non-rotation pin 1343 extends though an diametric opening in the end portion 1342 of the feed roll shaft 1340 and bears against the recess 1392 of the first bushing 1380 to prevent rotation of the feed roll shaft 1340.

The first and second bushings 1380, 1382 (best seen in FIG. 10) include respective larger diameter portions 1388, 1390 that are adjacent the respective inward facing surfaces 1237a, 1237b of the first and second side walls 1233a, 1233b. The larger diameter portions 1388, 1390 of the first and second bushings 1380, 1382 respectively receive and support the first and second c-shaped spacers 1350, 1352 which are interposed between the first and second ends 1316, 1318 of the feed roll 1302 and the first and second side walls 1233a, 1233b. More specifically, in one exemplary embodiment, as seen in FIG. 10, each of the c-shaped spacers 1350, 1352 includes an inner surface 1354 and an outer surface 1356 and a planar angled transition surface 1358 bridging the inner and outer surfaces 1354, 1356. The inner surface 1354 includes a planar upper portion 1366, an arcuate middle portion 1368, and a planar lower portion 1368. The arcuate middle portion 1368 of the c-shaped spacer 1350 fits snuggly over and around the large diameter portion 1388 of the first bushing 1380 to retain the first bushing 1380 within the interior region 1222 of the support portion 1220 of the frame body 1210. In the same way, the arcuate middle portion 1368 of the second c-shaped spacer 1382 fits snuggly over and around the large diameter portion 1390 of the second bushing 1382 to retain 1380 the second bushing 1382 within the interior region 1222 of the support portion 1220 of the frame body 1210. Each of the c-shaped spacers 1350, 1352 includes the outer surfaces 1356 having a planar lower portion 1362 and an arcuate portion 1362 bridged by a downwardly projecting tab 1360. As best seen in FIG. 13, the downwardly projecting tabs 1260 of the first and second c-shaped spacers 1350, 1352 contact forward facing surfaces 1279 of the blade constraint tabs 1277 of the forwardly extending mils 1276 of the upper blade cover 1270 of the blade support assembly 1250 thereby inhibiting rotational movement of the e-shaped spacers 1350, 1352 about the respective large diameter portions 1388, 1390 of the first and second bushings 1380, 1382.

In one exemplary embodiment, the OD1 is approximately 1.43 in, and the OD2 of the feed roll 1302 is approximately 1.25 in. In one exemplary embodiment, a length of the feed roll 1302 between first and second ends 1316, 1318 is approximately 2.875 in. In one exemplary embodiment, the feed roll 1302 is driven at a rotational speed of approximately 620 revolutions per minute and a minimum gap between the upper surface 1418 of the blade 1400 and the extending outer surface 1312a of the feed roll 1302 is approximately 0.05 in. As would be understood by one of skill in the art, the foregoing dimensions and rotational speeds may vary depending on the characteristics of the workpiece, the desired trimming operations to be performed and other factors.

Blade Retainer Assembly 1500

As discussed above and as best seen in FIGS. 5-9, the blade retainer plate 1510 of blade retainer assembly 1500 pivots about the blade retainer plate pivot axis BRPA between the first blade retaining position 1580 (FIGS. 5-7) and the second blade changing position 1590 (FIGS. 8 and 9), in the first blade retaining position 1580, the blade retainer plate 1510 is received in the back opening 1246 of the support portion 1220 of the frame body 1210 and thereby constrains the blade 1400 from movement in the rearward direction R such that the blade 1400 remains seated in the blade seating region 1257 of the blade support slot 1256 of the blade support assembly 1256. In the second blade changing position 1590 of the blade retainer plate 1510, the upper portion 1516 the blade retainer plate 1510 pivots away from the back or rear wall 1245 of the frame body 1210 such that the blade 1400 may be grasped by its back side 1412 (opposite the cutting edge front or forward side 1410) for removal of the blade 1400 by the operator though the rearward facing rectangular blade receiving opening 1258 of the blade support slot 1256. As shown schematically in FIG. 8, the blade 1400 is pulled in a rearward direction R through the back opening 1246 of the support portion 1220 of the frame body 1210 for removal of the blade 1400 from the blade support assembly 1250 of the head assembly 1200.

The blade retainer plate 1510 includes a first inner wall 1512 and a second outer wall 1514, the upper portion 1516 and a lower portion 1518 bridged by first and second lateral walls 1528a, 1528b. The upper and lower portions 1516, 1518 are spaced apart by the lateral walls 1528a, 1528b to form a central exit opening 1520 of the blade retainer plate 1510. The exit opening 1520 provides an exit passageway for a layer of tissue severed by the blade cutting edge 1420 from the workpiece, as the operator advances the power operated trimming tool 1000 along the outer surface of the workpiece. Extending forwardly from the first inner wall 1512 is a comb bar 1525 that includes a plurality of space apart angled projections 1527 that engage the severed layer of tissue and direct the severed tissue rearwardly through the exit opening 1520. The comb bar 1524 prevents the severed tissue from "missing" the central exits opening 1520 and moving upwardly along an inner surface of the back wall 1245 and becoming balled up and potentially interfering with the drive gear worm gear interface. Each of the plurality of projections 1577 of the comb bar 1525 extend into a respective cylindrical shaped gap between adjacent pairs of the plurality of circumferential sets of outwardly extending teeth 1330 of the feed roll 1302. Advantageously, as is best seen in FIG. 13, a central portion 1292 of an upper surface 1290 of the upper blade cover 1270 between the forwardly extending arms 1276 of the cover 1270 is angled upwardly from a distal end 1294 to a proximal end 1296 of the cover 1270. This angled upper surface 1290 of the upper blade cover 1270, together with an angled surface 1522 of the upper portion 1516 and a complementary angled surface 1524 of the lower portion 1518 and the angled projections 1527 of the comb bar 1524 provide a smooth flow path for severed tissue from the cutting edge 1420 of the blade 1400 traversing in the rearward direction R along an upper surface 1418 of the blade 1400, transitioning to and traveling along the angled upper surface 1290, and exiting the trimming tool 1000 through the blade retainer plate exit opening 1520. The blade retainer assembly 1500 further includes a pair of retainer plate fasteners 1560, a latch 1530, a side wall fastener 1572, a latch fastener 1570, and a securement knob 1550.

The lateral walls 1528a, 1528b of the blade retainer plate 1510 include respective outer side surfaces 1529a, 1529b facing away from the handle assembly longitudinal axis LA. In the lower portion 1518 of the blade retainer plate 1510, the respective outer side surfaces 1529a, 1529b of the lateral walls 1528a, 1528b include threaded openings 1519. The retainer plate threaded openings 1519 are aligned with respective threaded openings 1239a, 1239b in the outward facing surface 1249a, 1249b of the first and second side walls 1233a, 1233b of the frame body support portion 1220. A pair of threaded fasteners 1560 are threaded through the retainer plate openings 1519 and into the threaded openings 1239a, 1239b to pivotally secure the blade retainer plate 1510 to the lower portions 1235a, 1235b of the first and second side walls 1233a, 1233b of the frame body support portion 1220. The blade retainer plate pivot axis BRPA extends though and is defined by a center line through the threaded fasteners 1560, that is, the blade retainer plate 1510 pivots between the first blade retaining position 1580 and the second blade changing position 1590 by pivoting about the blade retainer plate pivot axis BRPA extending though the threaded fasteners 1560.

In the upper portion 1516 of the blade retainer plate 1510, the respective outer side surfaces 1529a, 1529b of the lateral wall 1528a, 1528b include threaded openings 1517, When the blade retainer plate 1510 is in the first blade retaining position 1580, the retainer plate threaded openings 1517 are aligned with respective recesses 1238a, 1238b in the rearward facing surfaces 1234a, 1234b of the first and second side walls 1233a, 1233b. The side wall fastener 1572 threads into the threaded opening 1517 on the side of the recess 1238a. The side wall fastener 1572 includes a non-threaded middle portion 1572a between an enlarged head of the fastener 1572 and a distal threaded portion. The non-threaded middle portion 1572a of the side wall fastener 1572 has an extent that substantially corresponds to a width or thickness of the side wall 1233a in the region of the recess 1238a, When the blade retainer plate 1510 is in the first blade retaining position 1580, the threaded portion of the side wall fastener 1572 is threaded into the threaded opening 1517 of the outer side surface 1529a of the lateral wall 1528a and the non-threaded middle portion 1572a is received in the recess 1238a. The side wall fastener 1572 is tightened such that an enlarged head of the fastener 1572 bears against the outer surface 1529a of the first side wall 1233a to help secure the blade retainer plate 1510 in the first blade retaining position 1280.

Additionally and advantageously, the latch 1530 (FIGS. 8 and 9) is provided to positively secure the blade retainer plate 1510 in the first blade retaining position 1280. The latch 1530 includes a first end 1532 pivotally coupled to the upper portion 1516 of the blade retainer plate 1510 and a spaced apart second, latching end 1534. The first end 1532 of the latch 1530 includes a central circular opening 1533, while the second latching end 1134 includes a hook 1536. The securement knob 1550 includes a threaded interior opening that threads onto the threaded end portion 1346 of the feed roll shaft 1340 that extends beyond the outward facing surface 1249b of the second side wall 1233b. The latch fastener 1570 also includes a non-threaded middle portion 1570a between an enlarged head of the fastener 1570 and a distal threaded portion. The non-threaded middle portion 1570a of the latch fastener 1570 has an extent that substantially corresponds to a total of: a) a width or thickness of the side wall 1233b in the region of the recess 1238b; plus b) a width or thickness of the latch 1530 in a region adjacent the first end central opening 1533. When the blade retainer plate 1510 is in the first blade retaining position 1580, the threaded portion of the latch fastener 1570 is threaded through the central opening 1533 of the first end 1532 of the latch 1530 and into the threaded opening 1517 of the outer side surface 1529b of the lateral wall 1528b thus pivotally securing the latch 1530 to the upper portion 1516 of the blade retainer plate 1510. A portion of the non-threaded middle portion 1570a is received in the recess 1238b. The latch 1530 is then pivoted with respect to the latch fastener 1570 such that the hook 1536 of the latch 1530 overlies a shaft 1552 of the securement knob 1550 thereby latching or locking the blade retainer plate 1510 in the first blade retaining position 1580 and the latch fastener 1570 is tightened. When in the first blade retaining position 1580 of the blade retainer assembly 1580, as can best be seen in FIG. 13, the lower portion 1518 of the blade retainer plate 1510 is in proximity to the blade receiving opening 1258 of the blade receiving slot 1256 of the blade support assembly 1250 and thereby maintains the blade 1400 within the slot 1256 by preventing the blade 1400 from moving in the rearward direction R. More specifically, the lower portion 1518 of the blade retainer plate 1510 contacts a proximal end 1264 of the lower blade support ledge 1260 and the proximal end 1296 of the upper blade cover 1280 to thereby overlie the blade receiving opening 1258 of the blade receiving slot 1256 of the blade support assembly 1250 and thereby maintain the blade 1400 within the slot 1256 by preventing the blade 1400 from moving in the rearward direction R. That is, a lower section or region 1512a of the inner wall 1512 of the blade retainer plate 1510 defined by the lower portion 1518 of the plate 1510 bears against a proximal end 1264 of the lower blade support ledge 1260 and the proximal end 1296 of the upper blade cover 1280 to overlie the blade receiving opening 1258 of the blade receiving slot 1256. The lower section 1512a of the inner wall 1512 of the blade retainer plate 1510 contacts and bears against the back side 1412 of the blade 1400 as necessary to prevent the blade 1400 from moving in the reward direction R away from its seated position in the blade seating region 1257 of the blade support assembly 1250.

To move the blade retainer plate 1510 from the first blade retaining position 1580 to the second blade changing position 1590, the latch fastener 1570 and the side wall fastener 1572 are slightly loosened and the latch 1530 is pivoted upwardly and away from the shall 1552 of the securement knob 1550 thereby allowing the blade retainer plate 1510 to pivot along its pivot axis BRPA. As the blade retainer plate 1510 pivots along its pivot axis BRPA to the second blade changing position 1590, the upper portion 1516 of the blade retainer plate 1510 moves away from the back or rear wall 1245 of the support portion 1220 of the frame body 1210 and the lower section 1512a of the inner wall 1512 of the blade retainer plate 1510 moves away from the blade receiving opening 1258 and the back, side 1412 of the blade 1400 to allow for access to the back side 1412 of the blade 1400.

In the first blade retaining position 1580 of the blade retainer plate 1510, the upper portion 1516 of the blade retainer plate 1510 is adjacent a lower end of the back or rear wall 1245 of the frame body support portion 1220 and, as can be seen in FIG. 2, the outer wall 1514 of blade retainer plate 1510 is substantially axially aligned with an outer surface of the back wall 1245 of the frame body support portion 1120.

Shaft Drive Transmission 1700 and Motor 1800

As seen in FIG. 1, in one exemplary embodiment, the flexible shaft drive transmission 1700 operatively coupled the rotational power supplied by the remote, external motor 1800 to the drive mechanism 1600 of the power operated trimming tool 1000 to rotate the feed roll 1302 of the feed roll assembly 1300 about the feed roll axis of rotation FRA. The flexible shaft drive transmission includes the outer casing 1710 and the flexible drive shall or flex shaft 1730 which is driven by the motor 1880 to rotate about the flex shaft axis of rotation FSA which is aligned with and coincident with the central longitudinal axis LCA of the flexible transmission 1700. The outer casing 1710 of the shaft drive transmission 1700 includes the motor end coupling 1712 at a proximal end of the casing 1710, which releasably coupled to the mating motor coupling 1802 of the motor 1800. The outer casing 1710 of the shaft drive transmission also includes the tool end coupling 1714 at the distal end of the casing 1710. The tool end coupling 1714 includes the driver assembly 1716 which is secured to the handle assembly 1100 by the driver retainer assembly 1160 and extends into the throughbore 1102 of the handle assembly 1100. The flex shaft 1730 includes the driven fitting 1732 at a proximal end of the flex shaft 1730 and the drive fitting 1734 at a distal end of the flex shaft 1730.

The flexible shaft drive transmission 1700 includes the drive engagement assembly 1750. The driver engagement assembly 1750 includes the engagement lever 1770 and a catch 1752 coupled to a proximal end 1717 of the driver assembly 1716. The engagement lever 1770 includes the gripping portion 1776, the generally u-shaped portion overlying the knob 1162 of the flex shaft retainer assembly 1160 of the handle assembly 1100, and a pivot portion 1772 pivotally coupled to the catch 1752. The lever 1770 pivots about the connection between the pivot portion 1772 and the catch 1772 about a latch pivot axis LPA with is offset from and substantially orthogonal to the handle assembly longitudinal axis LA. As explained previously, when the operator grasps the gripping portion 1776 of the engagement lever 1770 and pivots the lever 1770 to the operating position 1780 wherein the lever gripping portion 1776 is substantially parallel to the handle assembly longitudinal axis LA, sliding contact between the generally u-shaped portion 1774 of the engagement lever 1770 and the corresponding inclined front surface 1176 of an outer surface 1169 of the knob 1162 of the driver retainer assembly 1160 cause the driver assembly 1716 to move in the forward direction F or advance a short distance within the handle assembly throughbore 1102. The advancement of the driver assembly 1716 within the handle assembly throughbore 1102 results in an operative engagement of the drive fitting 1734 of the rotating flex shaft 1730 with a driven fitting 1630 of the drive gear 1602 of the drive mechanism 1600 of the power operated trimming tool 1000 to thereby cause rotation of the feed roll 1302 about its axis of rotation FR.

When the operator releases the gripping portion 1776 of the engagement lever 1770, the lever 1770 pivots outwardly and away from the handle assembly longitudinal axis LA. The biasing spring 1718 of the driver assembly 1716 is compressed within the handle assembly throughbore 1102 and thus, when the lever gripping portion 1776 is released by the operator, the biasing spring 1718 pushes or urges the driver assembly 1716 in the rearward direction R, as explained previously, thereby such that the drive fitting 1734 of the flex shaft driven fitting 1630 disengages from the driven fitting 1630 of the drive gear 1602. Thus, in the disengagement position 1782 of the lever gripping portion 1776, no rotational power is supplied to the drive gear 1602 of the drive mechanism 1600 to rotate the feed roll 1302. However, advantageously, because of the driver retainer assembly 1160 of the handle assembly 1100, the driver assembly 1716 remains in place within the handle assembly throughbore 1002, even when the lever 1770 is released because a portion of the peripheral surface 1178 of the latch 1170 defining the latch opening 1171 to bear against the shoulder 1720 of the driver assembly 1716. This interference between the driver assembly shoulder 1720 and the latch 1170 maintains the driver assembly 1716 within the handle assembly throughbore 1102. To remove the driver assembly 1716 from the handle assembly throughbore 1002, the operator must press on the actuation surface 1172 of a latch 1170 of the driver retainer assembly 1160 to permit the driver assembly 1716 to be moved in the rearward direction R away from the handle assembly 1100.

In one exemplary embodiment the external motor 1800 is a brushless DC servo motor. Additional details regarding the flexible shaft drive transmission 1700 and the electric motor 1800 are disclosed in U.S. Pat. No. 9,121,438 to Mascari, issued on Sep. 1, 2015, and assigned to the assignee of the present invention. The aforesaid U.S. Pat. No. 9,121,438 to Mascari is incorporated herein in entirety by reference.

In one exemplary embodiment, the handle assembly 1100 may be fabricated of plastic or other material or materials known to have comparable properties and may be formed by molding and/or machining. The frame body 1210 may be fabricated of aluminum or stainless steel or other material or materials known to have comparable properties and may be formed/shaped by casting and/or machining. The knife blade 1300, components of the feed roll assembly 1300, the blade retainer assembly 1500, and the drive mechanism may be fabricated of a hardenable grade of alloy steel or a hardenable grade of stainless steel, or other material or materials known to have comparable properties and may be formed/shaped by machining, forming, casting, forging, extrusion, metal injection molding, additive manufacturing and/or electrical discharge machining or another suitable process or combination of processes Annular, as used herein, means generally ring-like or generally ring-shaped in configuration and includes configuration wherein the ring includes or does not include a split extending through a diameter of the ring or annulus. Axially above or axially spaced above, as used herein, means positioned, above as viewed with respect to an axis, for example, the frame body central axis FBCA, even if the two elements are not in axial alignment with respect to the axis. Similarly, the terms axially below or axially spaced below, as used herein, means positioned below as viewed with respect to an axis, for example, the frame body central axis FBCA, even if the two elements are not in axial alignment with respect to the axis. Axially extending, as used here, means one element extends from and is positioned above or below a second element with respect to an axis, even if the two elements are not in axial alignment with respect to the axis. Similarly, the terms radially offset from, radially outward of, radially inward of, as used herein, means one element is positioned offset from a second element, as viewed along a radius line extending radially from an axis, the feed roll axis of rotation FRA of the feed roll 1302, even if the two elements are not in radial alignment along the radius line.

Second Exemplary Embodiment—Power Operated Trimming Tool 2000

Figure 14:
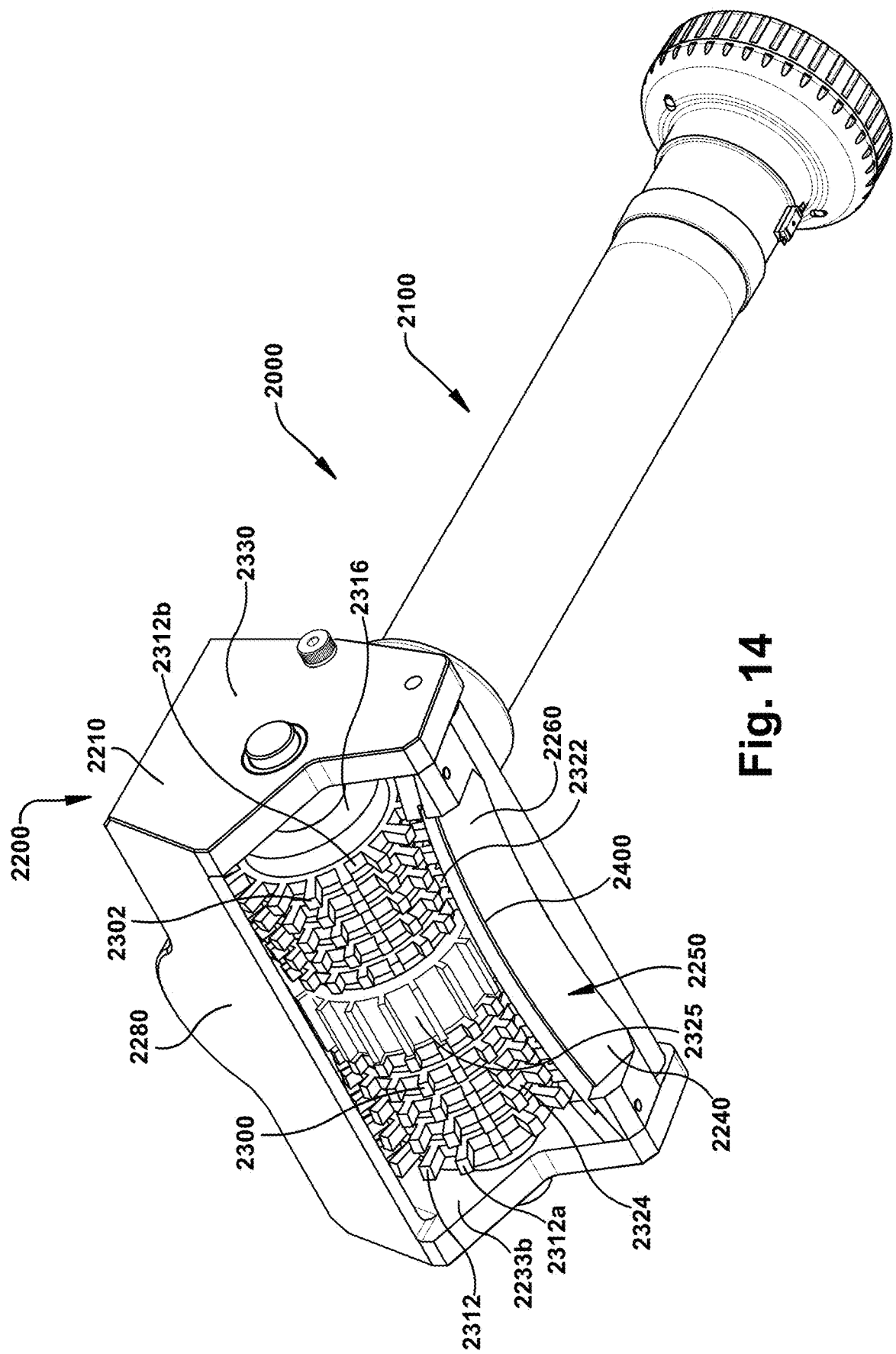
FIG. 14 is a schematic bottom, front perspective view of a second exemplary embodiment of selected components of a power operated trimming tool of the present disclosure, including a head assembly having a frame body, the frame body supporting a feed, roll assembly having a feed roll with a contoured outer surface, a curved blade support assembly, and a curved blade having an arcuate cutting edge.
Figure 15:
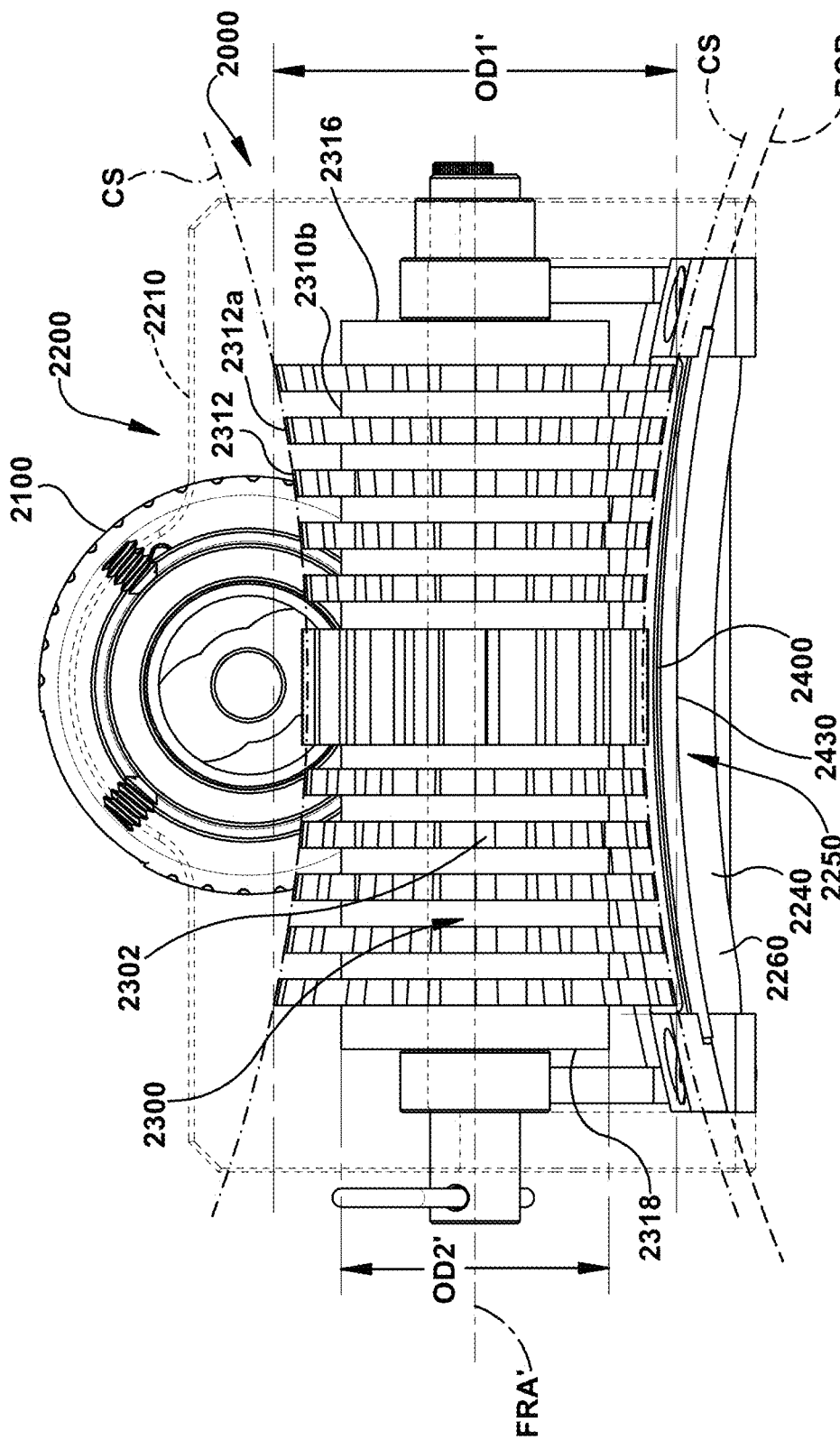
FIG. 15 is a schematic front elevation view of selected components of the power operated trimming tool of FIG. 14 with the frame body in dashed line to more clearly show the configuration of the feed roll and curved blade support assembly and blade.
Figure 16:
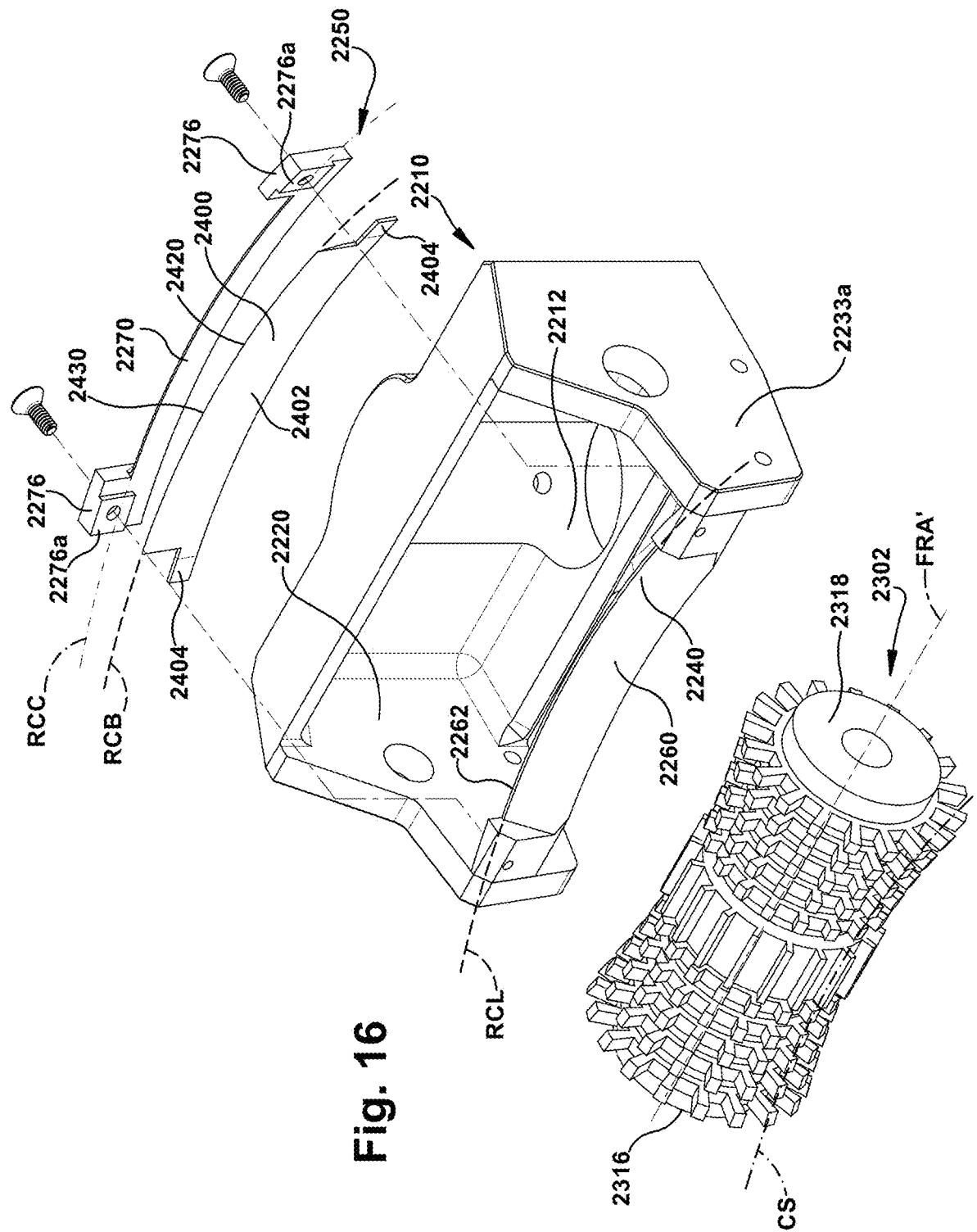
FIG. 16 is a schematic exploded bottom, front perspective view of selected components of the power operated trimming tool of FIG. 14.

A second exemplary embodiment of a power operated trimming tool of the present disclosure is schematically shown, generally at 2000, in FIGS. 14-16. This exemplary embodiment of the power operated trimming tool 2000 is suited for trimming and cutting operations for workpieces wherein the outer surface of the workpiece tends to be more arcuate and less planar when view with respect to an effective cutting width of the blade 2400, as supported by a blade support assembly 2250. The effective cutting width of the blade 2400 is defined by a length of a cutting edge 2420 between the pair of overlying, forwardly extending arms 2276 of an upper blade cover or centering band 2270. The power operated trimming tool 2000 is advantageously employed, for example, if the workpiece is a pork loin having an outer layer of tissue (fat tissue) that is generally arcuate when viewed in cross section to a path of travel of the trimming tool 2000 along the workpiece, and it is desired to remove an outer layer of tissue. Given the arcuate outer surface of such a workpiece, use of a power operated trimming tool, such as the power operated trimming tool 1000 having a planar blade with a straight line or linear cutting edge and a corresponding feed roll, wherein the extending outer surface of the feed roll outer surface has the general configuration or shape of a right angled cylinder, may not be as efficient for trimming operations as using the power operated trimming tool 2000 of the second exemplary embodiment.

As can be seen in FIG. 15, when viewed in front plan view, because the blade 2400 is arcuate, a central portion 2430 of the cutting edge 2410 of the blade vertically or axially above first and second lateral sides 2414, 2416. Utilizing the arcuate blade 2400 advantageously provides for a curved cutting edge 2420 that more closely conforms to the arcuate outer surface of the workpiece. The power operated trimming tool 2000 includes a slightly curved or arcuate blade 2400 having a curved or arcuate cutting edge 2420 and a feed roll assembly 2300. The feed roll assembly 2300 includes a contoured feed roll 2302, that is, in one exemplary embodiment, the feed roll 2302 includes an extending outer surface 2312a wherein at least a portion of that extending outer surface 2312a is arcuate or curved, having a radius of curvature CS that substantially matches a radius of curvature RCB of the blade cutting edge 2420

For brevity, the structural details/functions/advantages of those components and assemblies of the power operated trimming tool 2000 which are similar to the corresponding components and assemblies of the power operated trimming tool 1000 will not be repeated in detail, all of the structural details/functions/advantages discussed above with respect to the power operated rotary knife 100 are hereby incorporated by reference with respect to the second exemplary embodiment. Explanations regarding the description of the power operated trimming tool 1000, set forth above, are also hereby incorporated by reference with respect to the second exemplary embodiment. Common reference numbers and letters used in the two embodiments are assumed to represent similar concepts and/or structural details. Additionally, the power operated trimming tool 2000 may be advantageously utilized with the motor 1800 and the flexible shaft drive transmission 1700, as described above, with respect to the power operated trimming tool assembly 999.

As best seen in FIGS. 14 and 15, the power operated trimming tool 2000 includes a handle assembly 2100, similar to the handle assembly 1100 of the first exemplary embodiment. The head assembly 2200 includes a frame body 2210, generally similar to the frame body 1210 of the first embodiment. The frame body 2210 includes an interface portion 2212, for coupling to a distal end portion 2106 of the handle assembly 2100, and a support portion 2220, which supports the blade 2400, a blade support assembly 2250 and the feed roll assembly 2300. With respect the head assembly 2200, since the blade 2400 is arcuate, the blade support assembly 2250 of the head assembly must be similarly arcuate shaped to support the blade 2400. The blade support assembly 2250 includes a lower blade support ledge 2260 and an upper blade cover or centering band 2270. The lower blade support ledge 2260 is defined by a cross member 2240 extending between first and second side walls 2233a, 2233b of the frame body 2210.

The feed roll assembly 2300 includes the contoured feed roll 2302. The feed roll 2302 includes an inner surface 2310 and a radially spaced apart outer surface 2312 and extends between a first end 2316 and a second end 2318. The feed roll 2302 rotates about a feed roll axis of rotation FRA'. The outer surface 2312 of the feed roll 2302 is contoured to substantially conform to the shape of the blade 2400 and, specifically, the blade cutting edge 2420. The feed roll outer surface 2312 includes a base outer surface 2312b, defined by outer surface portions in regions other than the plurality of projections or teeth 2332, and an extending outer surface 2312a, defined by distal outer surface of individual teeth of the plurality of teeth 2332. The extending outer surface 2312a defines a first, maximum outer diameter OD1' of the feed roll 2302, while the base outer surface 2312b defines a second, minimum outer diameter OD2' of the feed roll 2307. The base outer surface 2312b is substantially cylindrical in shape or configuration, while the extending outer surface 2312a has the radius of curvature CS, which is generally equal to the radius of curvature RCB of the cutting edge 2420 of the blade 2400.

Because the base outer surface 2312b is substantially uniform or constant between the first end 2316 and the second end 2318 of the feed roll 2302, the minimum outer diameter OD1' defines a cylindrical surface when viewed from the first end 2316 to the second end 2318 of the feed roll 2302. However, the extending outer surface 2312a is concave with respect to the feed roll axis of rotation FRA' between the first end 2316 and the second end 2318. Accordingly, the first, maximum outer diameter OD1' of the base outer surface 1312a is arcuate moving from a largest or greatest diameter at each of the first and second ends 2316, 2318 of the feed roll 2302 and tapering to a smaller diameter at a center of the feed roll 2302. Essentially, the taper of the extending outer surface 2312b matches the curvature of the blade cutting edge 2420 to advantageously maintain a constant or uniform depth of cut along the entirety of the blade cutting edge 2420 that is exposed to the workpiece. The arcuate contour of the extending outer surface 2312a of the feed roll 2302 is illustrated schematically in FIG. 15 as dashed lines schematically representing the radius of curvature CS of the extending outer surface 2312a of the feed roll 2302. In one exemplary embodiment, the radius of curvature of the dashed lines CS representing the arcuate contour of the extending outer surface 2312a of the feed roll 2302 is approximately 7.25 in.

Similarly, the blade support assembly 2250 is configured with a radius of curvature that substantially matches the radius of curvature of the blade cutting edge 2420. As best seen in FIG. 16, a front edge 2262 of the lower blade support ledge 2260 defines the radius of curvature RCL (radius of curvature of the blade support ledge 2260) of the blade support assembly 2250. The upper blade cover 2270 has substantially the same radius of curvature (labeled as RCC in FIG. 16) as the radius of curvature RCL of the blade support ledge 2260. The radii of curvature RCL and RCC of the blade support assembly 2250 are substantially equal to the radius of curvature RCB of the blade cutting edge 2420 and substantially equal to the radius of curvature CS of the extending outer surface 2312a of the feed roll 2302.

Alternate Embodiment—Blade and Blade Retainer Plate

Figure 17:
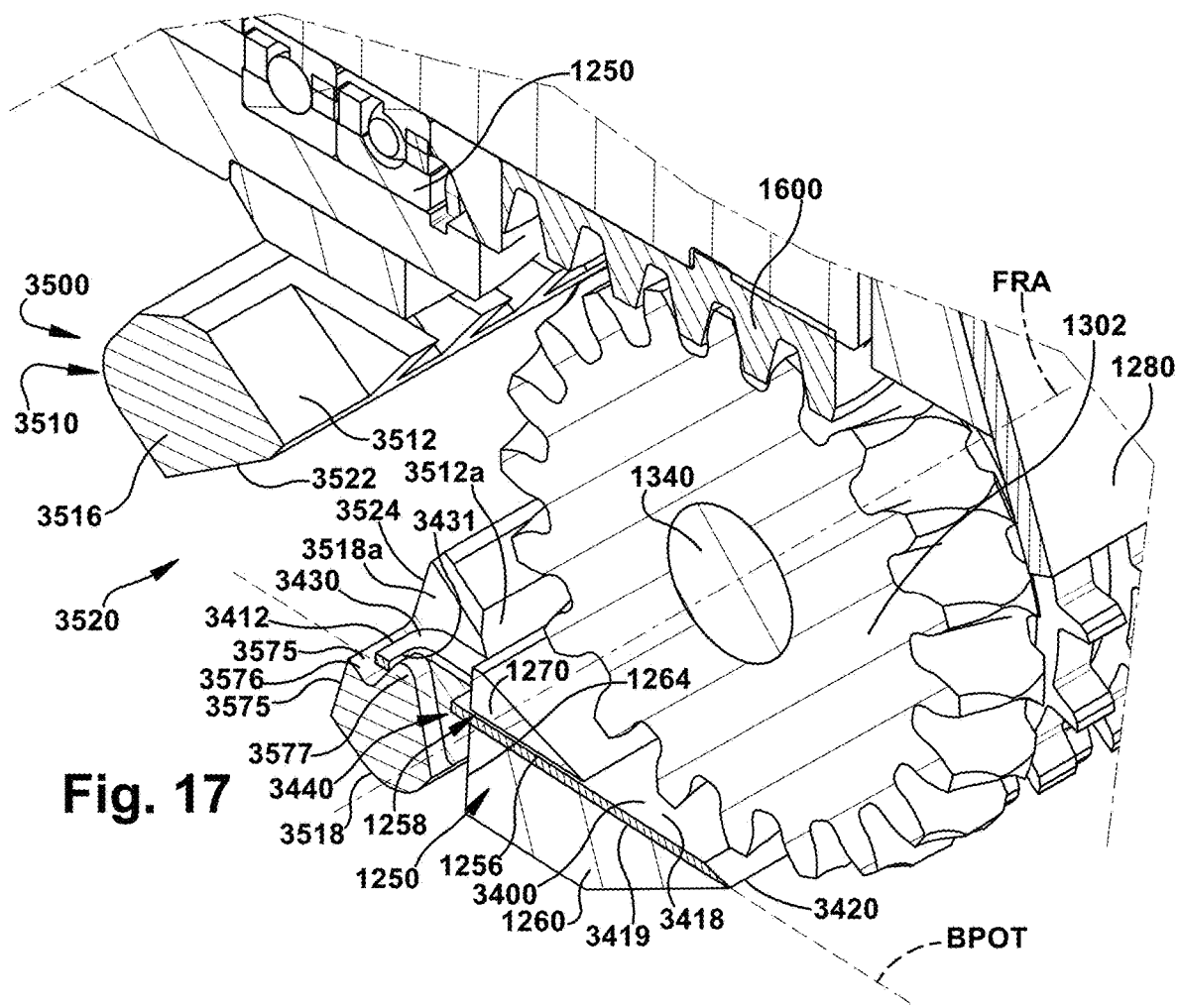
FIG. 17 is a schematic top, front, perspective longitudinal section view of front portion of the power operated trimming tool of FIG. 1, with an alternate exemplary embodiment of a blade and a blade retainer plate of a blade retainer assembly of the power operated trimming tool, with the blade being in a partially ejected position with respect to the blade support assembly.
Figure 18:
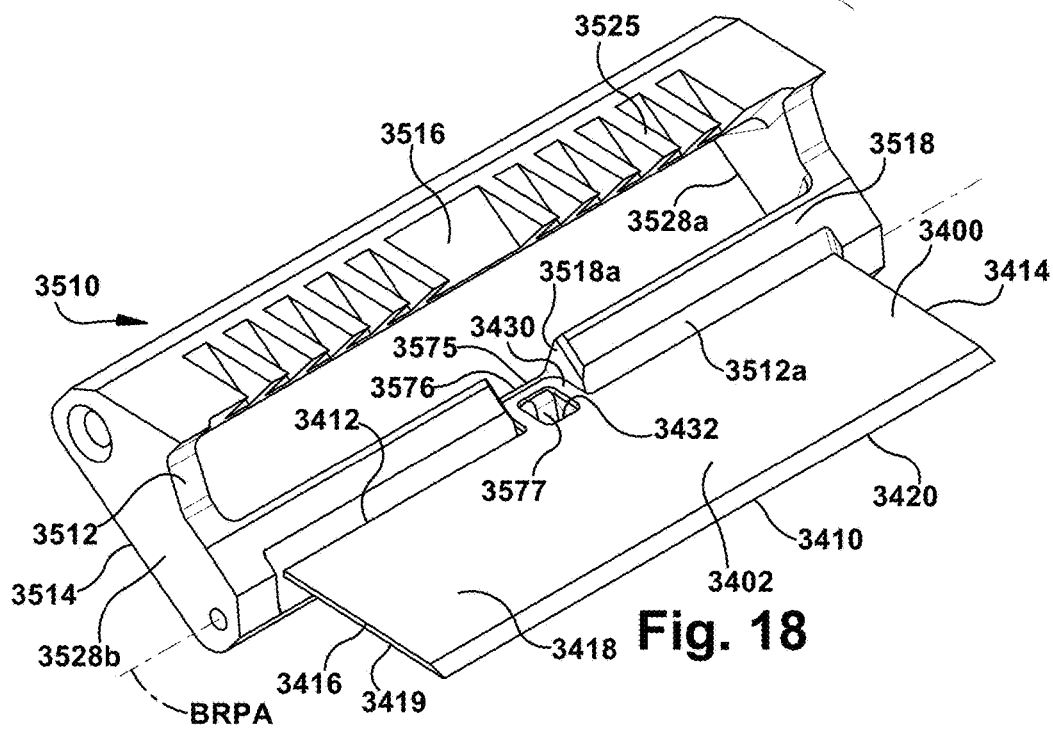
FIG. 18 is a schematic front perspective view of the blade and blade retainer plate of the alternate exemplary embodiment of FIG. 17.
Figure 19:
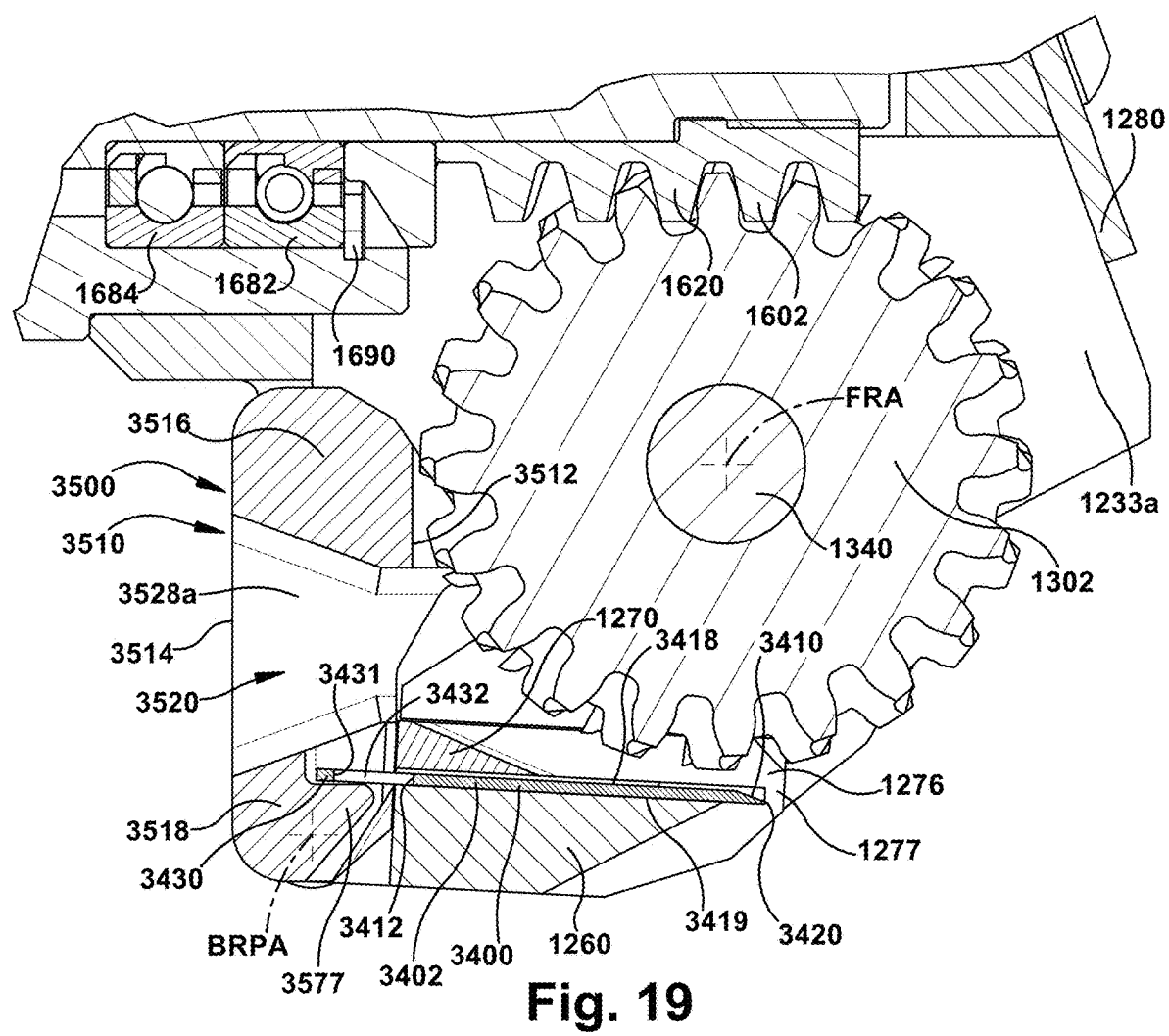
FIG. 19 is a schematic longitudinal section view of the front portion of the power operated trimming, with the alternate exemplary embodiment of a blade and a blade retainer plate of FIG. 17, with the blade retainer plate being in the blade retaining position.

An alternate exemplary of a planar blade and a blade retainer plate suitable for use in the power operated trimming tool 1000 of the first exemplary embodiment are shown generally at 3400 and 3510 in FIGS. 17-19. The blade retainer plate 3510 is configured to fit and function in the blade retainer assembly 1500 of the head assembly 1200 of the power operated trimming tool 1000 of the first exemplary embodiment. Similarly, the blade 3400 is configured to fit and function in the blade support assembly 1250 of the head assembly 1200 of the power operated trimming tool 1000 of the first exemplary embodiment. As noted above, the blade retainer plate 3510 is a component of a blade retainer assembly 3500, which is generally similar in function to the blade retainer assembly 1500 of the first exemplary embodiment. The remaining components of the blade retainer assembly 3500 are similar to the components of the blade retainer assembly 1500 of the first exemplary embodiment. Reference is made to the discussion of the first embodiment of the power operated trimming tool 1000 for all other components, which will not be repeated herein for brevity purposes. Advantageously and additionally, the blade 3400 and the blade retainer plate 3510 include blade ejection features that facilitate removal of the blade 3400 from the blade support assembly 1250 of the power operated trimming tool 1000 as the blade retainer plate 3510 is pivoted from a first blade retaining position (schematically depicted in FIG. 19, similar to the first blade retaining position 1580 of the blade retainer assembly 1500 of the first exemplary embodiment) to a second blade changing position (similar to the second blade changing position 1590 of the blade retainer assembly 1500 of the second exemplary embodiment). The blade ejection features of the blade 3400 and the blade retainer plate 3510 combine to pull or move the blade 3400 generally rearwardly and slightly upwardly a short distance along a blade path of travel BPOT (FIG. 17). That is, as the blade retainer plate 3510 is moved from the first blade retaining position 1580 to the second blade changing position 1590, the blade ejection features of the blade 3400 and the blade retainer plate 3510 partially remove the blade 3400 from the blade support slot 1256 by pulling the blade rearwardly and upwardly along the blade path of travel BPOT. The blade path of travel BPOT In defined by the configuration of the blade support slot 1256, that is, the surfaces of the lower blade support ledge 1260 and the upper blade cover 1270 defining the blade support slot 1256 force the blade to move along the blade path of travel BPOT that is substantially aligned with and extending along a plane defined by the blade support slot 1256. The blade path of travel BPOT is relatively short, being constrained at one forward endpoint by the confines of the blade support slot 1256. That is, as explained previously, forward movement of the blade 3400 within the blade support slot 1256 is constrained by the respective tabs 1277 of the forward portions of the extending arms 1276 of the upper blade cover 1270 that extend downwardly to contact the lower blade support ledge 1260 and thereby limit or constrain the blade 1400 from forward movement within the blade support slot 1256. As will be explained below, the rearward movement of the blade 3400 within the blade support, slot 1256 to a second rearward endpoint is limited by the engagement of a hook 3577 of the blade retainer plate 3510 within an opening 3432 defined by a link 3430 formed along a back side 3412 of the blade 3400.

Like the blade 1400 of the first exemplary embodiment, in one exemplary embodiment, the blade 3400 includes a generally planar body 3402 having a front or forward side 3410, the back side 3412 and first and second lateral sides 3414, 3416 extending between the forward side 3410 and the back side 3412. Like the blade 1400, the body 3402 of the blade 3400 includes an upper surface 3418 and a lower surface 3419 and a cutting edge 3420 formed along an intersection of the forward side 3410 and the lower surface 3419. Unique to the blade 3400 of the alternate exemplary embodiment is the rearwardly extending link 3430 that extends from the back side 3412 of the blade 3400. As is best seen in FIG. 18, the link 3420 is aligned with and continues the generally planar body 3402 of the blade 3400 and defines a rearwardly protruding portion of the back side 3412 of the blade 3400. The link 3420 includes the generally square opening 3432 extending through the upper and lower surfaces 3418, 3419 of the blade 3400. The opening 3432 of link 3420 is sized to slidingly receive the generally upwardly protruding hook 3577 of the blade retaining plate 3510.

As can best be seen in FIGS. 18 and 19, the blade retaining plate 3510 of the blade retainer assembly 3500 includes a first, inner wall 3512 and a second, outer wall 3514. The blade retainer plate 3510 further includes an upper portion 3516 and a lower portion 3518 separated by first and second lateral walls 3528a, 3528b. Similar to the first embodiment, angled upper and lower surfaces 3522, 3524 defined by the upper portion 3516 and the lower portion 3518 define a gap or exit opening 3520 of the blade retainer plate 3510. A central section 3518a of the lower portion 3518 of the blade retainer plate 3510 defines a generally u-shaped cut-out 3575. The u-shaped cut-out 3575 of the lower portion 3518 of the blade retainer plate 3510 extends between the first, inner wall 3512 and the second, outer wall 3514 of the retainer plate 3510. Protruding upwardly from a generally planar lower surface 3576 defining the u-shaped cut-out 3575 is the upwardly protruding hook 3577. As can be seen in FIG. 19, in the first blade retaining position 1580 of the blade retainer plate 3510, the upwardly protruding hook 3577 is positioned just below the opening 3432 of the link 3420 of the back side 3412 of the blade 3400.

As the blade retainer plate 3510 is pivoted to its second blade changing position 1590 and thus rotates about the blade retainer plate pivot axis BRPA, the upwardly protruding hook 3577, which is close to the blade retainer plate pivot axis BRPA moves both upwardly and outwardly away from the proximal end 1264 of the blade support ledge 1260 of the blade support assembly 1250. As the protruding hook. 3577 moves or rotates upwardly and outwardly, away from the proximal end 1264 of the blade support ledge 1260, as can be seen in FIGS. 17 and 18, the protruding hook 3577 enters into the opening 3432 of the link 3430 and bears against a forward facing interior surface 3431 of the link 3430. The continued rotation or arcuate movement of the protruding hook 3577 of the blade retainer plate 3410 as the blade retainer plate continues to pivot about its pivot axis BRPA, in turn, moves the blade 3400 generally rearwardly along the blade path of travel BPOT (FIG. 17) to the second rearward endpoint which corresponds to an ejection position 3440 of the blade 3400. However, since the blade retainer plate 3510 pivots between its first blade retaining position 1580 and the second blade changing position 1590, the protruding hook 3577 rotates or moves in an arcuate path and thus the protruding hook 3577 enters into the link opening 3432 and as the protruding hook 3577 continues its arcuate movement, the protruding hook 3577 slides downwardly within the link opening 3432. As the blade retainer plate 3510 continues its downward pivot as it moves to the second blade changing position 1590, the protruding hook 3577 slides more and more downwardly within the link opening 3432. Ultimately, at a point wherein the protruding hook 3577 disengages from the link 3430, there is no further rearward movement of the blade 3402 along the blade path of travel BPOT and the blade remains in the ejection position 3440 wherein it is easier for the operator to grasp the back side 3412 of the blade 3400 and then pull the blade 3400 rearwardly completely out of the blade support slot 1256 for purposes of changing, sharpening or cleaning the blade 3400.

The schematic depiction in FIG. 17 illustrates a position of the blade 3400 in the ejection position 3400, which may be just short of the second rearward endpoint of the blade 3400 along the blade path of travel BPOT, that is, a partial ejection position. The schematic depiction in FIG. 17 of the blade 3400 along the blade path of travel BPOT is shown just prior to the protruding hook 3577 disengaging from the link 3430 of the blade 3400. As can be seen in FIG. 17, the blade retainer plate 3510 is in an intermediate position between the first blade retaining position 1580 (FIG. 19) and the second blade changing position 1590 (shown, for example in FIG. 8), The blade 3400, as shown in FIG. 17, has been pulled or moved by the hook 3577 in the generally rearward direction R along the blade path of travel BPOT such that the back side 3412 of the blade 3400 is moved beyond the blade receiving opening 1258 of the blade support slot 1256 of the blade support assembly 1250, that is, beyond the proximal end 1264 of the lower blade support ledge 1260 of the blade support assembly 1250. Depending on the exact position of the protruding hook 3577 within the link opening 3432 in FIG. 17, the full ejection position of the blade may be just slightly rearward of the ejection position 3440 depicted schematically in FIG. 17. However, as can be seen from the ejection position 3440 of the blade 3400 depicted in FIG. 17, which is very close to or at the location of the second rearward endpoint along the blade path of travel BPOT, the hack side 3412 of the blade 3400 is moved beyond the blade receiving opening 1258 of the blade support slot 1256 of the blade support assembly 1250. The ejection position 3440 of the blade 3400 wherein the back side 3412 of the blade 3400 is beyond the proximal end 1265 of the blade support ledge 1200 of the blade support assembly 1250 and is beyond the blade receiving opening 1258 of the blade support slot 1256 of the blade support assembly 1250 facilitates the operator grasping the blade 3400 and pulling it completely out of the blade support assembly 1250 for purposes of sharpening, cleaning or changing the blade 3400.

As used herein, terms of orientation and/or direction such as front, rear, forward, rearward, distal, proximal, distally, proximally, upper, lower, inward, outward, inwardly, outwardly, upwardly, downwardly, horizontal, horizontally, vertical, vertically, axial, radial, longitudinal, axially, radially, longitudinally, etc., are provided for convenience purposes and relate generally to the orientation shown in the Figures and/or discussed in the Detailed Description. Such orientation/direction terms are not intended to limit the scope of the present disclosure, this application, and/or the invention or inventions described therein, and/or any of the claims appended hereto. Further, as used herein, the terms comprise, comprises, and comprising are taken to specify the presence of stated features, elements, integers, steps or components, but do not preclude the presence or addition of one or more other features, elements, integers, steps or components.

What have been described above are examples of the present disclosure or invention, it is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A power operated trimming tool comprising:
   an elongated handle assembly including a throughbore extending along a longitudinal axis of the handle assembly, the handle assembly including handle including a handle body and a handle extension extending distally from the handle body, the handle extension having an inner surface defining a portion of the handle assembly throughbore and the inner surface of the handle extension including a bearing seating region, the bearing seating region defining a part of the handle assembly throughbore that is distal to the handle body;
   a drive gear supported for rotation about a drive gear axis of rotation by a shaft support assembly;
   the shaft support assembly including first and second bearing support assemblies disposed in the bearing seating region of the handle extension, the first and second bearing support assemblies of the shaft support assembly supporting the drive gear for rotation about the drive gear axis of rotation;
   a head assembly affixed to the handle extension of the handle assembly, the head assembly including a frame body and a rotating element;
   the rotating element supported for rotation about an axis of rotation, the drive gear operatively coupled to the rotating element to rotate the rotating element about the axis of rotation of the rotating element; and
   the frame body including an interface portion and a support portion extending from the interface portion, the interface portion coupled to a distal end portion of the handle extension to couple the head assembly to the handle assembly, the support portion supporting the rotating element.

2. The power operated trimming tool of claim 1 wherein the first and second bearing support assemblies of the shaft support assembly are longitudinally spaced apart and comprise first and second ball bearing assemblies.

3. The power operated trimming tool of claim 1 wherein the inner surface of the handle extension includes an annular groove adjacent the bearing seating region, a retaining ring is disposed in the annular groove to inhibit longitudinal movement of the first and second bearing support assemblies along the longitudinal axis of the handle assembly.

4. The power operated trimming tool of claim 1 the power operated trimming tool further includes a shaft drive transmission including a driver assembly releasably positioned within the handle assembly throughbore, a drive fitting supported by the driver assembly engaging a driven fitting of the drive gear such that rotation of the drive fitting rotates the drive gear about the drive gear axis of rotation.

5. The power operated trimming tool of claim 4 wherein the drive gear includes a worm gear driver at a distal end portion of the drive gear and the driven fitting at a proximal end portion of the drive gear.

6. The power operated trimming tool of claim 1 wherein the drive gear includes an intermediate shaft, the first and second bearing support assemblies bearing against the intermediate shaft to support the drive gear for rotation about the drive gear axis of rotation.

7. The power operated trimming tool of claim 6 wherein the intermediate shaft includes a driven fitting comprising a socket formed in a proximal end portion of the intermediate shaft.

8. The power operated trimming tool of claim 1 wherein the first and second bearing support assemblies are located about a longitudinal center point of the drive gear.

9. The power operated trimming tool of claim 4 wherein the power operated trimming tool further includes an external drive motor and wherein the shaft drive transmission is operatively coupled between the handle assembly and the external drive motor, the shaft drive transmission including an outer casing and a flex shaft rotatably supported within the outer casing, the flex shaft rotates about a flex shaft axis of rotation, the driver assembly is disposed at a distal end of the outer casing and the drive fitting is disposed at a distal end of the flex shaft.

10. The power operated trimming tool of claim 9 wherein the flex shaft axis of rotation and the drive gear axis of rotation are substantially aligned and coincident in a region of the handle assembly.

11. The power operated trimming tool of claim 1 wherein the rotating member is a feed roll and the axis of rotation of the rotating element is a feed roll axis of rotation and further wherein the feed roll is supported for rotation by a feed roll shaft extending through a central longitudinal opening of the feed roll and defining the feed roll axis of rotation and further wherein the trimming tool further includes a blade having a cutting edge extending along a forward side of the blade in proximity to an outer surface of the feed roll.

12. A power operated trimming tool assembly comprising:
a power operated trimming tool including:
an elongated handle assembly including a throughbore extending along a longitudinal axis of the handle assembly, the handle assembly including handle including a handle body and a handle extension extending distally from the handle body, the handle extension having an inner surface defining a portion of the throughbore and the inner surface of the handle extension including a bearing seating region;
a drive gear supported for rotation about a drive gear axis of rotation by a shaft support assembly, the drive gear including a worm gear driver at a distal end portion of the drive gear and an intermediate shaft extending from the worm gear driver;
the shaft support assembly including one or more bearing support assemblies disposed in the bearing seating region of the handle extension, the one or more bearing support assemblies of the shaft support assembly supporting the drive gear for rotation about the drive gear axis of rotation;
a head assembly affixed to the handle extension of the handle assembly, the head assembly including a frame body and a rotating element;
the rotating element supported for rotation about an axis of rotation, the drive gear operatively coupled to the rotating element to rotate the rotating element about the axis of rotation of the rotating element;
the frame body including an interface portion and a support portion extending from the interface portion, the interface portion coupled to a distal end portion of the handle extension to couple the head assembly to the handle assembly, the support portion supporting the rotating element; and
a shaft drive transmission including a driver assembly releasably positioned within the handle assembly throughbore, a drive fitting supported by the driver assembly engaging the drive gear such that rotation of the drive fitting rotates the drive gear about the drive gear axis of rotation.

13. The power operated trimming tool assembly of claim 12 wherein the rotating element is a feed roll and the axis of rotation of the rotating element is a feed roll axis of rotation and further wherein the power operated trimming tool includes an external drive motor and wherein the shaft drive transmission is operatively coupled between the handle assembly and the external drive motor, the shaft drive transmission including an outer casing and a flex shaft rotatably supported within the outer casing, the flex shaft rotates about a flex shaft axis of rotation, the driver assembly is disposed at a distal end of the outer casing and the drive fitting is disposed at a distal end of the flex shaft, the flex shaft axis of rotation and the drive gear axis of rotation being substantially aligned and coincident in a region of the handle assembly.

14. A power operated trimming tool comprising:
an elongated handle assembly including a throughbore extending along a longitudinal axis of the handle assembly, the handle assembly including handle including a handle body and a handle extension extending distally from the handle body, the handle extension having an inner surface defining a portion of the handle assembly throughbore and the inner surface of the handle extension including a bearing seating region, the bearing seating region defining a part of the handle assembly throughbore that is distal to the handle body;
a drive gear supported for rotation about a drive gear axis of rotation by a shaft support assembly, the drive gear including a worm gear driver at a distal end portion of the drive gear and an intermediate shaft extending from the worm gear driver;
the shaft support assembly including one or more bearing support assemblies disposed in the bearing seating region of the handle extension, the one or more bearing support assemblies of the shaft support assembly bearing against the intermediate shaft to support the drive gear for rotation about the drive gear axis of rotation;
a head assembly affixed to the handle extension of the handle assembly, the head assembly including a frame body and a rotating element;
the rotating element supported for rotation about an axis of rotation, the drive gear operatively coupled to the rotating element to rotate the rotating element about the axis of rotation of the rotating element; and
the frame body including an interface portion and a support portion extending from the interface portion, the interface portion coupled to a distal end portion of the handle extension to couple the head assembly to the handle assembly, the support portion supporting the rotating element.

15. The power operated trimming tool of claim 14 wherein the one or more bearing support assemblies are located about a longitudinal center point of the drive gear.

16. The power operated trimming tool of claim 14 wherein the one or more bearing support assemblies include first and second bearing support assemblies disposed in the bearing seating region of the handle extension.

17. The power operated trimming tool of claim 16 wherein the first and second bearing support assemblies of the shaft support assembly are longitudinally spaced apart and comprise first and second ball bearing assemblies.

18. The power operated trimming tool of claim 14 wherein the intermediate shaft of the drive gear includes a driven fitting comprising a socket formed in a proximal end portion of the intermediate shaft.

19. The power operated trimming tool of claim 14 wherein a distal section of the inner surface of the handle extension includes the bearing seating region.

20. The power operated trimming tool of claim 14 wherein the inner surface of the handle extension includes an annular groove adjacent the bearing seating region, a retaining ring is disposed in the annular groove to inhibit longitudinal movement of the first and second bearing support assemblies along the longitudinal axis of the handle assembly.

21. The power operated trimming tool of claim 14 wherein the rotating member is a feed roll and the axis of rotation of the rotating element is a feed roll axis of rotation and further wherein the worm gear driver of the drive gear operatively engages a worm wheel formed on an outer surface of the feed roll to rotate the feed roll about the feed roll axis of rotation.

22. The power operated trimming tool of claim 21 wherein the intermediate shaft of the drive gear includes a driven fitting comprising a socket formed in a proximal end portion of the intermediate shaft.

23. The power operated trimming tool of claim 16 wherein the first and second bearing support assemblies are located about a longitudinal center point of the drive gear.

24. The power operated trimming tool of claim 14 wherein the frame body includes an upper wall and first and second side walls extending from opposite ends of the upper wall, a rear wall extending from the upper wall and extending between the first and second side walls, the frame body supporting the rotating member within an interior region of the frame body.

25. The power operated trimming tool of claim 24 wherein the rotating member is a feed roll and the axis of rotation of the rotating element is a feed roll axis of rotation and further wherein the feed roll is supported for rotation by a feed roll shaft extending through a central longitudinal opening of the feed roll and defining the feed roll axis of rotation and extending between the first and second side walls of the support portion of the frame body.

26. The power operated trimming tool of claim 14 wherein the trimming tool further includes a blade having a cutting edge extending along a forward side of the blade in proximity to an outer surface of the rotating member.

* * * * *